US007828661B1

(12) United States Patent (10) Patent No.: US 7,828,661 B1
Fish et al. (45) Date of Patent: Nov. 9, 2010

(54) ELECTRONIC INVITATIONS FOR AN ON-LINE GAME

(75) Inventors: Edmund J. Fish, Great Falls, VA (US);
Allen J. Eichler, Waterford, VA (US);
June R. Herold, Falls Church, VA (US)

(73) Assignee: AOL Inc., Dulles, VA (US)

( * ) Notice: Subject to any disclaimer, the term of this patent is extended or adjusted under 35 U.S.C. 154(b) by 694 days.

(21) Appl. No.: 11/016,879

(22) Filed: Dec. 21, 2004

(51) Int. Cl.
*A63F 13/12* (2006.01)
(52) U.S. Cl. .................... 463/42; 709/202; 709/204
(58) Field of Classification Search .......... 463/40–42; 709/205, 206, 202, 224; 715/708, 739; 726/4
See application file for complete search history.

(56) References Cited

U.S. PATENT DOCUMENTS

| 5,971,854 | A | 10/1999 | Pearson |
| 6,559,194 | B2 | 5/2003 | Malwitz |
| 6,676,521 | B1 | 1/2004 | La Mura |
| 6,699,125 | B2* | 3/2004 | Kirmse et al. .................. 463/42 |
| 6,908,389 | B1 | 6/2005 | Puskala |
| 6,993,555 | B2* | 1/2006 | Kay et al. .................... 709/202 |
| 7,043,530 | B2* | 5/2006 | Isaacs et al. ................. 709/206 |
| 7,158,798 | B2 | 1/2007 | Lee |
| 7,168,089 | B2* | 1/2007 | Nguyen et al. ................. 726/4 |
| 7,194,004 | B1* | 3/2007 | Thomsen ..................... 370/401 |
| 7,222,171 | B2* | 5/2007 | Fukumoto et al. ........... 709/224 |
| 7,240,093 | B1* | 7/2007 | Danieli et al. ............... 709/205 |
| 7,313,760 | B2* | 12/2007 | Grossman et al. ........... 715/708 |
| 2002/0086732 | A1* | 7/2002 | Kirmse et al. ................. 463/42 |
| 2003/0125112 | A1* | 7/2003 | Silvester ...................... 463/42 |
| 2003/0182420 | A1* | 9/2003 | Jones et al. ................. 709/224 |
| 2003/0190960 | A1 | 10/2003 | Jokipii |
| 2004/0152517 | A1* | 8/2004 | Hardisty et al. ............... 463/42 |
| 2004/0198403 | A1 | 10/2004 | Pedersen |
| 2004/0224769 | A1 | 11/2004 | Hansen |
| 2004/0224771 | A1* | 11/2004 | Chen et al. .................... 463/42 |
| 2004/0224772 | A1* | 11/2004 | Canessa et al. ............... 463/42 |
| 2006/0031785 | A1* | 2/2006 | Raciborski .................. 715/859 |
| 2006/0100006 | A1* | 5/2006 | Mitchell et al. ................ 463/9 |

OTHER PUBLICATIONS

GameSpy Arcade—Play Hundreds of Online Multiplayer Games!, Viewing Your PlayerSpy List, http://www.gamespyarcade.com/support/help/communicate.shtml, pp. 1-3, Mar. 26, 2004.
GameSpy Arcade—Play Hundreds of Online Multiplayer Games!, Where You're At, http://www.gamespyarcade.com/support/help/youarehere.shtml, pp. 1-2, Mar. 26, 2004.

(Continued)

*Primary Examiner*—Peter DungBa Vo
*Assistant Examiner*—Masud Ahmed
(74) *Attorney, Agent, or Firm*—Finnegan, Henderson, Farabow, Garrett & Dunner, LLP

(57) ABSTRACT

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game.

16 Claims, 17 Drawing Sheets

OTHER PUBLICATIONS

GameSpy Arcade—Play Hundreds of Online Multiplayer Games!, GameSpy Arcade's User Rooms, http://www.gamespyarcade.com/support/help/userrooms.shtml, pp. 1-2, Mar. 26, 2004.

Roger Wilco Base Station, http://rogerwilco.gamespy.com/products/rwbs/index.html, pp. 1-2, Mar. 26, 2004.

Roger Wilco Product Information, http://rogerwilco.gamespy.com/products/rw/index.html, pp. 1-2, Mar. 26, 2004.

GameSpy Arcade—Play Hundreds of Online Multiplayer Games!, Unique Nicknames in GameSpy Arcade, http://www.gamespyarcade.com/support/nicknames.shtml, pp. 1-2, Mar. 26, 2004.

Pixel Technologies Cross-Platform Game Technology description, Pixel Technologies—ITV, Mobile and PC Entertainment & Edutainment Channels, http://www.pixel-tech.com/itvtechnology.html, pp. 1-2, Mar. 26, 2004.

Sega Sports, NFL 2K3 Video Game description, http://www.football-gaming.com/sega/nfl2k3/manual/xbox/xbox-25.html, pp. 1-2, Mar. 26, 2004.

Pixel Technologies, Cross-Platform Game Technology description, Pixel Technologies—ITV, Mobile and PC Entertainment & Edutainment Channels, http://www.pixel-tech.com/mobileonline.html, p. 1, Mar. 26, 2004.

GameSpy Arcade—Play Hundreds of Online Multiplayer Games!, Inviting people to Play a Game, http://www.gamespyarcade.com/support/help/player_match.shtml, pp. 1-2, Mar. 26, 2004.

GameSpy Arcade—Play Hundreds of Online Multiplayer Games!, Arcade Suppport Central, http://www.gamespyarcade.com/support/, pp. 1-2, Mar. 26, 2004.

GameSpy Arcade—Play Hundreds of Online Multiplayer Games!, Sending Files to Another User, http://www.gamespyarcade.com/support/help/file_transfer.shtml, pp. 1-2, Mar. 26, 2004.

GameSpy Arcade—Play Hundreds of Online Multiplayer Games!, Using Arcade's Client Side Filtering, http://www.gamespyarcade.com/support/filter.shtml, pp. 1-3, Mar. 26, 2004.

Non-Final Office Action dated Aug. 1, 2007 (U.S. Appl. No. 11/017,203).

Playing Internet Pool. Aug. 10, 2004. (3 pages) <http://web.archive.org/web/20040810213026/internetgames.about.com/library/weekly/aa012703a.htm>.

Yahoo Backgammon, Jun. 18, 2006. (4 pages) <http://web.archive.org/web/20060618071747/http://www.gammoned.com/yahoo-backgammon.html>.

OldYank's Unofficial Guide to Yahoo! Bridge. Dec. 2, 2002. (4 pages) <http://web.archive.org/web/20021206081528/http://www.geocities.com/oldyank1/yahoo.html>.

* cited by examiner

ELECTRONIC INVITATIONS FOR AN ON-LINE GAME

TECHNICAL FIELD

This description relates to inviting participants to join a gaming application accessible to networked computers.

BACKGROUND

On-line services may provide users with the ability to send and receive instant messages. Instant messages may be exchanged in a private on-line conversation between two or more people who have access to an instant messaging service and who have installed communications software necessary to access and use the instant messaging service. A participant list that includes the communications identities with which a user exchanges instant messages may be displayed for a user.

A game application may be accessible thorough a network of computers and may be referred to as an on-line game. Players may be invited to participate in an on-line game. Players scores, particularly the highest player scores, may be displayed for an on-line game in a ranked list referred to as a leaderboard.

SUMMARY

In one general aspect, a participant is invited to play a session of an on-line game. An indication is received of a potential participant of an on-line game accessible over a network of computers from a user designated as a game organizer. Transmission of an invitation to the potential participant to play the session of the on-line game is enabled. The invitation includes a game parameter to be applied to the session of the on-line game and a revise control operable to enable a user to indicate a different game parameter for the on-line game. An indication of a different game parameter is received. The different game parameter is communicated to the user designated as the game organizer.

Implementations may include one or more of the following features. For example, the user designated as the game organizer may be a user designated as an organizer of the session of the on-line game. The different game parameter may be applied to the session of the on-line game without affecting the designation of the game organizer of the session of the on-line game. The different game parameter may be applied to the session of the on-line game, and the potential participant may be designated as a game organizer of the session of the on-line game. The different game parameter may be applied to the session of the on-line game, and the potential participant may be designated as a game organizer of the session of the on-line game to replace the user designated as the game organizer.

Communicating the different game parameter to the user designated as the game organizer may include communicating a decline indicator for the on-line game session to the user designated as the game organizer and sending a new invitation to the user designated as the game organizer for a new session of the on-line game. The new invitation may include a new game parameter to be applied to the new session of the on-line game.

The invitation may include a control to conditionally accept the invitation to indicate that the invited participant is only willing to play if a revised game parameter is applied to the session of the on-line game. The revise control may be operable to initiate an instant messaging session between a user who received the invitation and a user who sent the invitation. The revise control may be operable to initiate a chat session between a user who received the invitation and a user who sent the invitation.

In another general aspect, a participant is invited to play a session of an on-line game accessible over a computer network. A participant list of potential participants for the session of the on-line game is displayed. The participant list is owned by an invited participant of the session of the on-line game. An indication of a potential participant of the session of the on-line game accessible over a network of computers is received from the invited participant of the session of the on-line game. The potential participant of the on-line game is an invited participant. Transmission of an invitation to the potential participant to play the session of the on-line game is enabled. A first user is permitted to invite other potential participants to the session of the on-line game by using a participant list of potential participants owned by the first user.

Implementations may include one or more of the features noted above and one or more of the following features. For example, the invited participant may be other than an original organizer of the session of the on-line game. The potential participant may be permitted to invite another potential participant to the session of the on-line game. The potential participant may not be permitted to invite another potential participant to the session of the on-line game.

A user interface for the session of the on-line game accessible over a network of computers may be displayed on a display device. A list of potential participants may be displayed on the display device such that the user interface for the session is not obscured. An indication of a potential participant from the list of potential participants may be received from a game participant playing the on-line game. Transmission of an invitation to the potential participant to play the session of the on-line game may be enabled. The invitation may be sent using a general-purpose instant messaging system. Sending the invitation may not interfere with playing on-line game. Sending the invitation may not obscure controls for playing the session of the on-line game or the user interface for playing the session of the on-line game.

In yet another general aspect, a participant is invited to play a session of an on-line game. An invitation addressed to a potential participant for a session of an on-line game accessible over a network of computers is received. Presentation to the potential participant of an indication of the invitation to play the session of the on-line game is enabled. Presentation to the potential participant of the invitation only after receiving confirmation from the potential participant that the invitation is to be displayed also is enabled.

Implementations may include one or more of the features noted above and one or more of the following features. For example, presentation may be enabled of a message that includes a control operable to display the invitation information. Display of the invitation information may include enabling display of information related to the invitation only after activation of the control operable to display the invitation information may be enabled. Presentation of an icon on a participant list also may be enabled.

The participant list may be a buddy list of an instant messaging system. Receiving an indication of a potential participant may include enabling a user to indicate the potential participant to be invited. Enabling presentation of the indication may include enabling presentation of an indicator on a participant list of the potential participant adjacent to the user who indicated the potential participant to be invited.

In yet another general aspect, a participant is invited to play a session of an on-line game. An indication is received of a participant who is organizing the session of the on-line game. Potential participants for the session are invited based only on the indication of the participant who is organizing the session. Transmission is enabled of an indication that the participant is organizing the session to the identified potential participants.

Implementations may include one or more of the features noted above and one or more of the following features. For example, at least one potential participant may be identified based on a participant list of participant identifiers associated with the at least one potential participant, where the participant list includes the participant who is organizing the session.

The participant list may include categories of participant identifiers such that a category is associated with one or more participant identifiers, and the participant list may include a particular category associated with the on-line game.

Display may be enabled of the indication on the participant list. Display may be enabled of the indication on the participant list adjacent to a participant identifier corresponding to the participant organizing the session. Display of the indication on the participant list may be disabled when a participant is no longer permitted to join the session.

In yet another general aspect, communicating transmission information includes transmitting, over a computer network from a game provider system to a first client system associated with a first potential player, a game application capable of enabling an session of an on-line game. Transmission information related to progress of transmission of the game application to the first client system associated with the first player is accessed. The data transmission information is provided, over the computer network to a second client system that is remote from the first client system and associated with a second potential player of the game.

Implementations may include one or more of the following features. For example, display of the transmission information may be enabled on a display device associated with the second client system. The transmission information displayed may include an estimated length of time required to complete transmission of the game application from the game provider system to the first client system or an amount of data related to the game application remaining to be transmitted from the game provider system to the first client system. The amount of data may include a number of files of the game application remaining to be transmitted from the game provider system to the first client system. The transmission information displayed may include the amount of data related to the game application that has been transmitted from the game provider system to the first client system. The amount of data may include a number of files of the game application that have been transmitted from the game provider system to the first client system.

A graphical representation of the transmission information may be displayed. The graphical representation of the transmission information may include a progress bar showing an amount of data that has been transmitted from the game provider system to the first client system relative to an amount of data remaining to be transmitted from the game provider system to the first client system.

Implementations of the techniques discussed above may include a method or process, a system or apparatus, or computer software on a computer-accessible medium.

The details of one or more of the implementations are set forth in the accompanying drawings and description below.

Other features will be apparent from the description and drawings, and from the claims.

DESCRIPTION OF THE DRAWINGS

Like reference symbols in the various drawings indicate like elements.

DETAILED DESCRIPTION

An instant messaging user may use a buddy list that includes a user-selected list of potential instant messaging recipients ("buddies") to identify another instant messaging user with whom instant messages are to be exchanged. An instant messaging user also may use a buddy list for other purposes, such as to initiate playing of an on-line game or to invite participants to play an on-line game.

An on-line game leaderboard may present a ranked list of the highest scoring game participants ("players"). The leaders displayed on a leaderboard may be selected from among all of the players who have played the particular game. Alternatively or additionally, a game leaderboard may rank the relative game scores of a subset of affiliated players. As such, the leaderboard may be referred to as a buddy leaderboard. For example, a leaderboard may rank all of the players who are identified as buddies on a particular player's buddy list or a subset of the players who are identified as buddies on a particular player's buddy list. A leaderboard also may rank players who are of a similar skill level for the on-line game to which the leaderboard applies. A player may enjoy the ability to learn who is the highest scoring player from among the player's acquaintances or the ability to determine where the player ranks relative the player's acquaintances. This may be particularly true when the game is played by many geographically-dispersed individuals, most of whom may not be acquainted with one another. Techniques are provided to invite a potential participant to play an on-line game by identifying the potential participant using a leaderboard for the on-line game to which the potential participant ("invitee") is invited.

In one exemplary implementation, a buddy list is a user-definable list of other co-users (i.e., buddies) of an on-line or network communications systems that enables the user to perceive presence information and changes for the co-users in a graphical user interface (GUI) and to track changes to presence status for the co-users in substantially real-time automatically, where presence indicates the status of the co-user with respect to the on-line or network communications system. The buddy list also provides the user with a mechanism to initiate communications (e.g., instant messages (IMs), electronic mail (e-mail), chat, and other communications) with the co-users. A buddy list may include one or more on-line game groups that associate buddies who are potential participants of a particular type of game or may include a general gaming group that associates buddies who are interested in on-line gaming.

Figure 1:
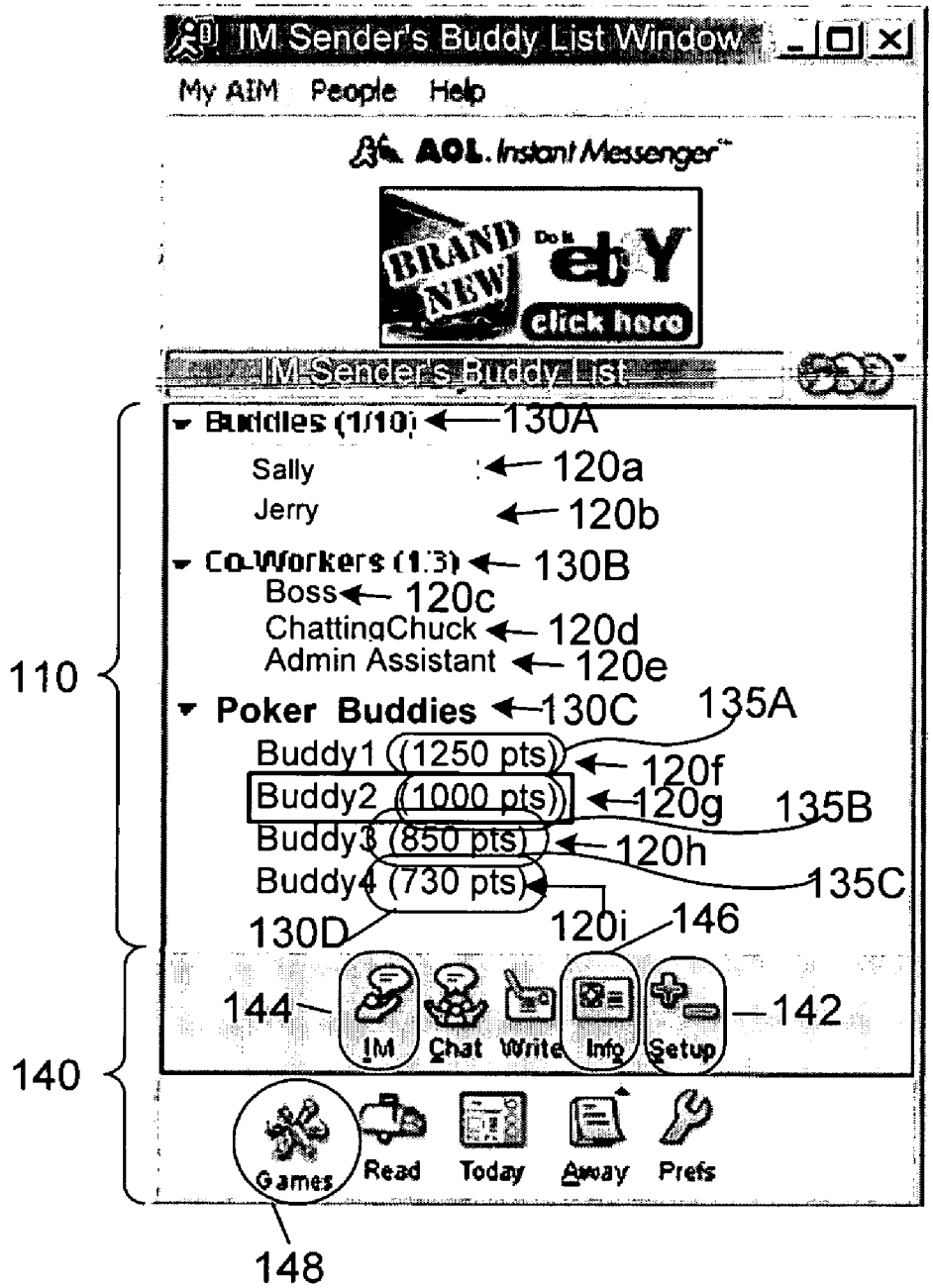
FIGS. 1-5 are diagrams of exemplary user interfaces for an instant messaging service capable of sending an invitation to a potential participant from a leaderboard for an on-line game.

FIG. 1 illustrates an exemplary graphical user interface 100 for an instant messaging service capable of enabling an invitation to a potential participant from a buddy leaderboard that associates a subset of potential participants from the set of all potential participants. Typically, the buddy leaderboard associates a number of potential participants who are affiliated or known to the potential instant message sender (e.g., the potential participants are friends, work together, have a mutual friend, are acquainted with one another through on-line gaming, or are of a similar skill level in an on-line game), though this need not necessarily be so. For example, a buddy leaderboard may associate randomly selected potential participants, such as may occur in an on-line game tournament or when a potential participant volunteers to join any on-going game of a particular game type and/or skill level.

The graphical user interface 100 includes a list 110 of potential instant messaging recipients ("buddies") 120*a*-120*i*. The potential instant message recipients also may be referred to as communication participants, communication identities, instant message users, friends or contacts. For convenience, the term "buddies" is used in this description, and, as such, the graphical user interface 100 may be referred to as an instant message buddy list window 100 or, more simply, a buddy list window 100, and the list 110 may be referred to as a buddy list 110. A buddy is identified by a screen name or other type of identity identifier, such as an account name, a user name, or a mobile telephone number. In particular, the user IMSender is an instant message sender using the user interface 100. The user interface (UI) 100 is rendered on a display of a computing device or a communication device on which an instant message client program is executed.

In the buddy list 110, the representations 120*a*-120*i* include text identifying the screen names of the buddies included in buddy list 110; however, additional or alternative information may be used to represent one or more of the buddies, such as an avatar or other type of graphical image that is associated with the buddy. The avatar or other image may be reduced in size and either still or animated. For example, the representation 120*c* includes the screen name of the instant message recipient named Boss. For convenience, each of the representations 120*a*-120*i* may be referred to as a screen name 120*a*-120*i*. In some implementations, one or more of the representations 120*a*-120*i* may be an alias of a screen name rather than a screen name itself. The representations 120*a*-120*i* may provide connectivity information to the instant message sender about the buddy, such as whether the buddy is on-line, how long the buddy has been on-line, whether the buddy is away from the computing device or communication device and remains signed-on to the instant message service, or whether the buddy is available through a mobile device.

Buddies may be grouped by an instant message sender into one or more user-defined or pre-selected groupings ("groups"). As shown, the instant message buddy list window 100 has three groups, Buddies 130A, Co-Workers 130B, and Poker Buddies 130C. Sally 120*a* belongs to the Buddies group 130A, and ChattingChuck 120*d* belongs to the Co-Workers group 130B. When a buddy's instant message client program is able to receive communications, the buddy is said to be on-line and the representation of the buddy in the buddy list is displayed under the name or representation of the buddy group to which the buddy belongs. As shown, all of the potential instant messaging recipients 120*a*-120*i* are on-line. In contrast, when a buddy's instant message client program is not able to receive communications (e.g., a buddy is not signed-on to the instant message service), the representation of the buddy in the buddy list may not be displayed under the group with which it is associated, and instead, may be displayed with representations of buddies from other groups under the heading Offline (not shown).

The Poker Buddies group 130C of the buddy list 110 includes buddies 120*f*-120*i* that are potential participants of an on-line game (here, an on-line poker game). The Poker Buddies group 130C may be referred to as a game buddy group because the list of buddies are organized in relation to a particular on-line game. The buddy list 110 also may be referred to as a game buddy list 110. The screen names for buddies may be added to the Poker Buddies group 130C in a conventional manner (e.g., a buddy is configured as a member of the group 130C by the owner of the buddy list and represents a person with some sort of affiliation with the owner of the buddy list), and, as such, represents a permanent member of the group 130C.

In addition, screen names for the buddies of the game group 130C may be added by the instant messaging system after the owner of the buddy list plays a game with the buddy. A buddy added to a game group in such a manner may be associated with the buddy list for a limited period of time and may be referred to as a temporary game buddy. For example, a buddy list may permit a predetermined number of temporary game buddies to be displayed on the buddy list, and a temporary buddy may be displaced by other more recent temporary game buddies (e.g., temporary game buddies "roll-off" the buddy list on a first-in, first-out basis as additional temporary game buddies are added to the buddy list). As such, the gaming group 130C may be used to help track game relationships that naturally occur in the course of gaming. Including temporary game buddies on the buddy list may be useful to allow a user to invite a user (who is identified as temporary game buddy on a buddy list) subsequently to play a game other than the first game that resulted in the temporary game buddy being added to the buddy list, particularly in a gaming context in which people join games without first having a personal acquaintance.

Each of the buddies 120*f*-120*i* in the game group 130C also includes parenthetical information 135A-135D that indicates the accumulated game score each of the buddies 120*f*-120*i*. The buddies 120*f*-120*i* in the game group 130C are presented based on the relative ranking of the accumulated game scores 135A-135D. In particular, the game buddy 120*f* is presented first because the game buddy 120*f* has the highest accumulated game score or ranking 135A (here, 1250 points) of the accumulated game scores or ranking 135A-135D of the game buddies 120*f*-120*i* listed in the game group 130C. Similarly, the game buddy 120*g* is presented second because the game buddy 120*g* has the second highest accumulated game score or ranking 135B (here, 1000 points), and game buddy 120*h* is listed third and has the third highest accumulated game score or ranking 135C (here, 850 points). The game buddy 120*g* may not necessarily be the overall game leader (e.g., highest scoring player) across all game participants because, for example, there may be game participants that have higher accumulated game scores that do not appear in the game group 130C. The ranking of buddies in the game group 130C is a relative ranking of the buddies that are associated with the game group 130C. As such, the game group 130C also may be referred to as a buddy leaderboard for the particular game (here, poker).

In other implementations, the score or ranking displayed for a buddy may be relative to the score or ranking of the buddy list owner. For example, if IMSender had a ranking of 900 points, the rankings displayed for buddies 120*f*-120*i* would be, respectively, 350, 100, –50 and –170. In yet other implementations, the score for the buddy list owner may be displayed, or the buddy list owner may be included in the list.

The buddy list window 100 also includes controls 140 that a user may use to initiate functions. In particular, a setup control 142 allows for configuration of the currently displayed buddy list. Selecting the setup control 142 enables the addition and deletion of screen names, such as screen names 120*a* and 120*b*, and groups, such as groups 130A and 130B, to the buddy list 110. After selecting a screen name 120*b* from the buddy list 110, selecting an IM control 144 displays an interface for communicating with the account corresponding to the selected screen name. Selecting the IM control 144 without selecting an on-line screen name in the buddy list 110 displays an interface for communicating and allows a user to identify an instant messaging user that is not on the user's buddy list. An info control 146 displays information related to a screen name selected on the buddy list 110 when information is available about the selected buddy. Such information may include, for example, name, geographic location, interests and hobbies, and occupation of the buddy. In some implementations, a user may configure whether such information is displayed to other users.

The buddy list window 100 also includes a games control 148 to initiate an on-line gaming application. In particular, the games control 148 initiates display of a game interface from which one of multiple on-line games may be selected and which may be used to invite a buddy to participate in an on-line game, as described more fully with respect to FIG. 2.

In some implementations, a buddy leaderboard that tracks individual scores may be used to track the scores that different players attain in a single-player game. As such, in some respects, the buddy leaderboard makes a single-player game into a multi-player game by allowing cross-game competition between players where the player scores attained by individual players are accumulated in the buddy leaderboard.

Figure 2:
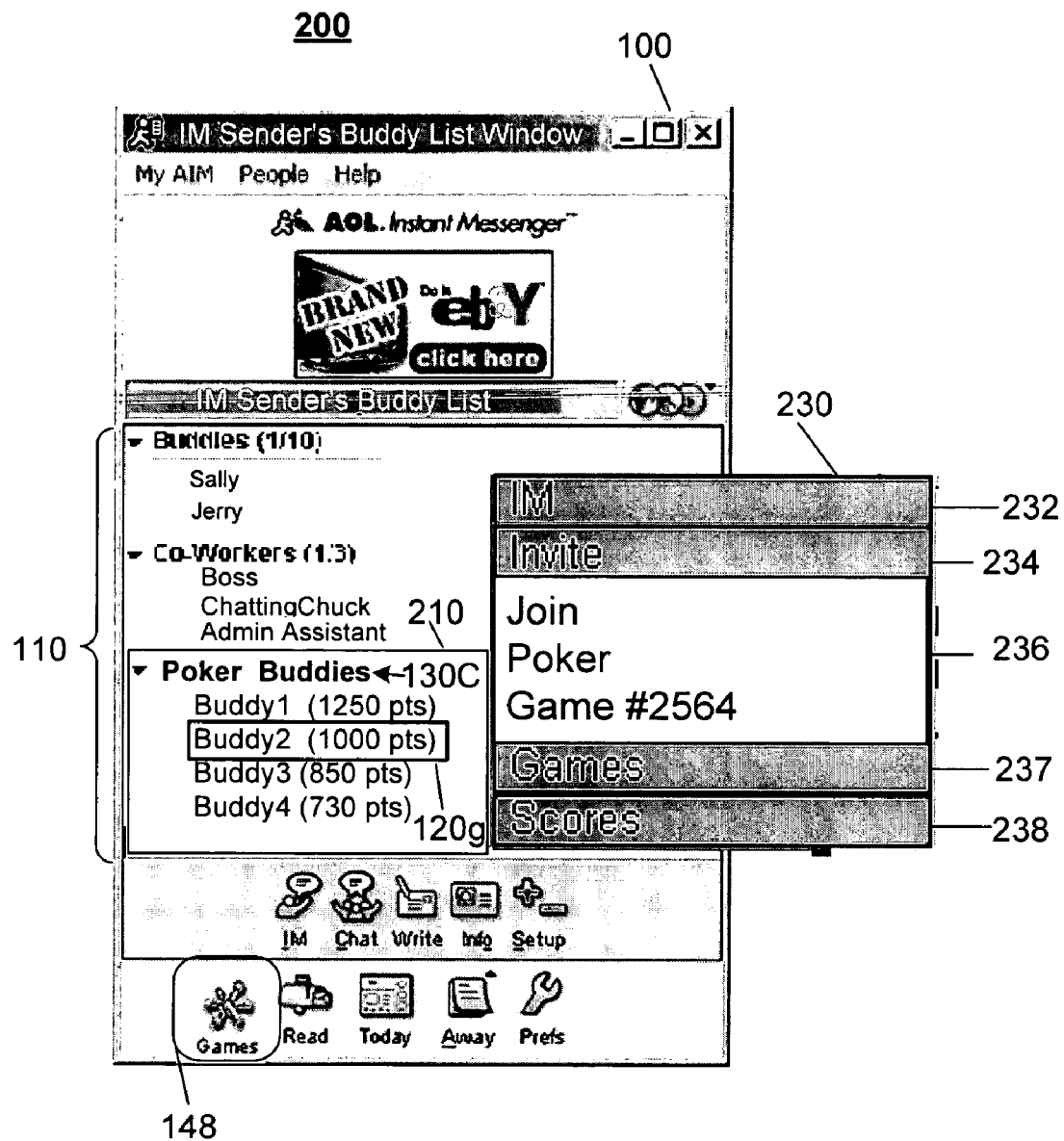

FIG. 2 illustrates an example user interface 200 that includes a buddy list 110 having a buddy leaderboard 210 operable to invite potential game participants. More particularly, the user interface 200 includes a buddy list 110 that includes the game group 130C of the buddy list 110 of FIG. 1 and a game menu 230. The game group 130C displays the relative ranking of the buddies based on accumulated points in an on-line poker game application. As such, the game group 130C also may be referred to as a buddy leaderboard 210. The user interface 200 is operable to display the game menu 230, for example, in response to the activation of games control 148 by a user or when a game buddy is selected from the leaderboard 210. As illustrated here, the game buddy 120*g* is selected from the leaderboard.

The game menu 230 includes multiple selection options 232-238. A selection option 232 is operable to send a general purpose instant message to a buddy selected from the leaderboard. A selection option 234 is operable to invite the selected buddy 120*g* to play the game identified by game group 130*c* on the leaderboard (here, poker). A selection option 236 enables the owner of the buddy list 110 to join a particular game in progress. As illustrated, the selection option 236 enables the user IM sender to join poker game number 22564. A selection option 237 displays a list of games to which the user may invite the selected buddy and/or may join, and a selection option 238 displays scores for all buddies for various games. In some implementations, the scores selection option 238 may enable a user to display only scores for the selected buddy or the buddies identified in the game group 130C.

Figure 3:
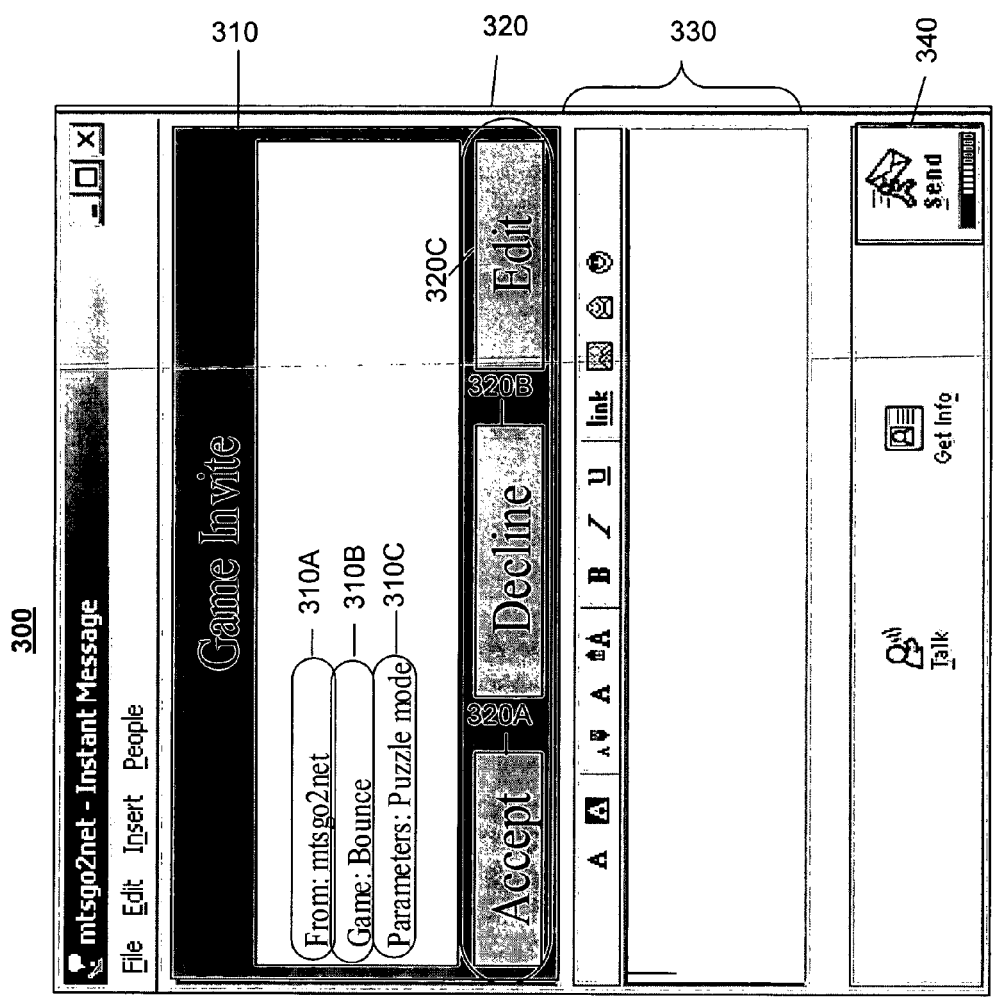

FIG. 3 illustrates a game invitation window 300 that may be displayed to invite a user to play an on-line game. For example, the game invitation window 300 may be displayed on a display device used by an invited participant in response to the activation of the invite selection option 234 of FIG. 2. The game invitation window 300 also may be displayed in response to the selection of a buddy 120*f*-120*h* from the game group 130C of FIG. 1.

The game invitation window 300 includes an invitation information portion 310. The invitation information portion 310 identifies the user 310A (i.e., "mtsgo2net") issuing the invitation, the game 310B (i.e., "Bounce") to which the user is being invited, and game parameters 310C (i.e., "Puzzle mode") that govern the game identified in 310B. The ability to provide configuration information about game parameters with an invitation allows, for example, an invitee to make an informed decision about whether to participate based on the configuration parameters of the game. In one example, a buddy may be invited to play a particular flavor or type of a game, such as a particular type of poker, and decide whether or not to accept the game invitation based on the type of poker to be played. This may obviate the need to replace a player who initially accepted the invitation to play poker without knowing the type of poker to be played and later drops out of the game after finding out the type of poker to be played.

The game invitation window 300 also include controls 320. An accept control 320A is operable to indicate the invitee's acceptance of the invitation (e.g., willingness to play the game). The accept control 320A also may launch the game application associated with the identified game 310B or otherwise enable the invitee to begin playing the game.

A decline control 320B is operable to send an IM or another type of communication to the game initiator or organizer (e.g., the owner of the buddy list from which the invitation was sent) to inform the game organizer that the invitee is unwilling or unable to play the game. This may be useful to provide notice to the game organizer that the invited player is not going to play.

In some implementations, an edit control 320C is operable to permit a user to change the game parameters 310C. Editing the parameter may result in a decline of the original offer and an invitation to play the game with different parameters, which also may cause the "ownership" of the game (which may influence who is able to invite players to the game and control other aspects of the game) to change from the user who originally issued the invitation to the potential player who conditionally accepted the invitation. A user who is considered the owner of the game also may be referred to as a game organizer. Alternatively, editing the parameters may result in a proposal to modify the game parameters but leave the game ownership unchanged (that is, residing with the original initiator who may choose to have the parameters changed automatically or after prompting). Alternatively or additionally, a user may be able to configure whether editing game parameters causes a change in game ownership change on a transient or persistent basis.

The game invitation window 300 also, through the exchange of instant messages, enables negotiation of game parameters during the invitation process. More particularly, as illustrated here, the send control 340 allows a user, who is a recipient of the game invitation, to propose alternative or additional game parameters by sending, to the game organizer, a message entered in the response compose window 330 to propose one or more game parameters or conditions under which the invitee is willing to play the game. This enables the negotiation of game parameters between the game organizer and the invitee before the game begins. For example, an invitee to participate in a football game may conditionally accept the invitation by indicating that the invitee is only willing to play under certain game conditions. An example exchange of instant messages between the invitee and the game organizer follows:

Invitee: Yes, I'll play if I can be the blue team.
Game organizer: The blue team is already taken. How about being the red team?
Invitee: Okay, I'll play if I can be the red team.
Game organizer: Sounds good.

The invitee then may indicate the invitee's willingness to play by selecting the accept control 320A to launch the particular on-line game application.

In some implementations, the game invitation window 300 may be generated by the on-line game application (rather than an instant message service) and enable the invited player to accept 320A the invitation, decline 320B the invitation to provide notice to the game organizer that the invited player is not going to play the game, and/or edit 320C the game parameters.

The game invitation window 300 may be include an embedded link (such as an hypertext mark-up language link (HTML-link)) that is activated to launch the game application on the invitee's computing device or communication device and, thus, enable the invitee to play the game to which the invitee was invited. The game invitation window 300 also may be a form-based dialog box that is able to launch the game application on the invitee's computing device or communication device through the selection of a type of control other than a link.

Figure 4:
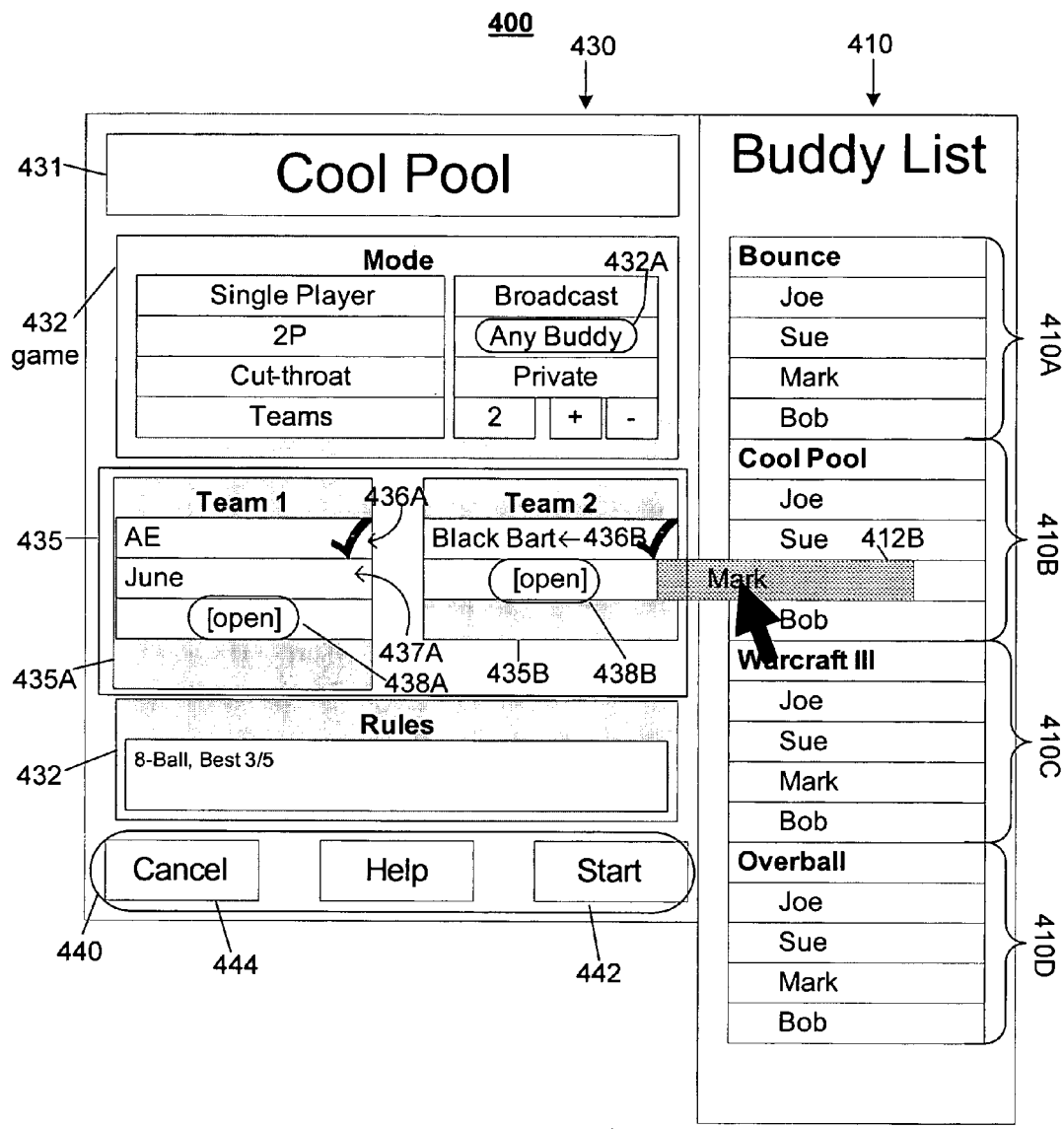

FIG. 4 illustrates another example user interface 400 that includes a buddy list 410 operable to invite potential participants to an on-line game. In contrast with the user interface 200 of FIG. 2 and the user interface 300 of FIG. 3, the user interface 400 is integrated into the game application itself. The user interface 400 includes a leaderboard 410 that includes multiple leaderboards 410A, 410B, 410C and 410D, each of which is applicable to a different game. In one example, leaderboard 410B represents the buddies for the game "Cool Pool" in order of each buddy's accumulated score. As shown and in contrast to the buddy leaderboard 110 presented in FIGS. 1-3, each of the leaderboards 410A, 410B, 410C and 410D ranks the buddies based on a buddy's accumulated score and does not display each buddy's accumulated score.

The user interface 400 also includes game information window 430 for the "Cool Pool" game 431. The game information window 410 allows a user of the interface 400 to invite a buddy and manage the invitation process for a game of "Cool Pool." The game information window 430 also includes game parameters 432 describing the mode of play as well as the rules by which the game is to be played. For example, the game parameter 432A allows buddies other than buddies appearing on the leaderboard 410B to be invited to play in the game, as indicated by the "Any Buddy" game parameter 432A. In some implementations, the "Any Buddy" game parameter 432A may still require an invitee to appear on a buddy list of one of the other invited potential participants. An invitation in such a case may be referred to as "a friend of a friend" invitation. This enables, for example, an invitee to the game to invite the invitee's own buddy (who is not a buddy of the game originator) to participate in the game. In some implementations, the "Any Buddy" game parameter 432A does not necessarily limit invitations only to potential participants that appear on the game organizer's buddy list or a buddy list of an invitee. For example, the "Any Buddy" game parameter 432A may indicate a broadcast invitation sent to multiple potential participants that may not necessarily appear on a buddy list. This may be particularly useful for a game that requires a large number of game participants:

The game invitation information window 430 also includes information 435 as to participant assignments to one of multiple teams for the game. As illustrated, the team information 435 includes indications of potential participants who have been invited, who have accepted, and any open slots for which invitations may be sent. More particularly, a first team 435A includes up to three participants, and a second team 435B includes up to two participants. Invitations to two of the participant slots 436A and 437A have been sent, and one open slot 438A remains for which an invitation may be sent. The team information window 435 indicates that the invited participant 436A has accepted the invitation, as shown by check mark associated with the invited participant 436A. In contrast, the invited participant 437A has not yet accepted, as shown by the lack of a check mark associated with invited participant 437A. Similarly, team information 435B for the second team indicates that the invited participant 436B has accepted, and there is an open slot 438B for which an invitation may be sent. Thus, the user interface 400 helps in keeping track of which invitees have accepted. This may be particularly useful when individual invitations are sent to invited potential participants.

The user interface 400 is operable to allow a user to drag-and-drop a buddy from the cool pool buddy leaderboard 410B into any open slot listed in game team information 435. As illustrated, the buddy 412B is dragged onto the open slot 439B of the information 435B for the second team, which causes an invitation to be sent to the buddy 412B, as described previously.

The game information window 430 also includes controls 440, including a cancel control 444 that allows a user to cancel the invitation issued to one of the users who have not yet responded. For example, the invitation to invited buddy 438A of the first team may be canceled to enable invitations to be sent to two potential participants for the open slot 439A and the newly-opened slot resulting from the cancellation of slot 438A of team information 435A for the first team. In some implementations, an invitation may be automatically cancelled without further user manipulation after a predetermined amount of time has passed since the invitation was sent. The predetermined amount of time may be user-configurable.

A start control 442 is operable to launch the Cool Pool game application for the players who have accepted invitations, with the players being assigned to the teams as indicated in team information 435.

Figure 5:
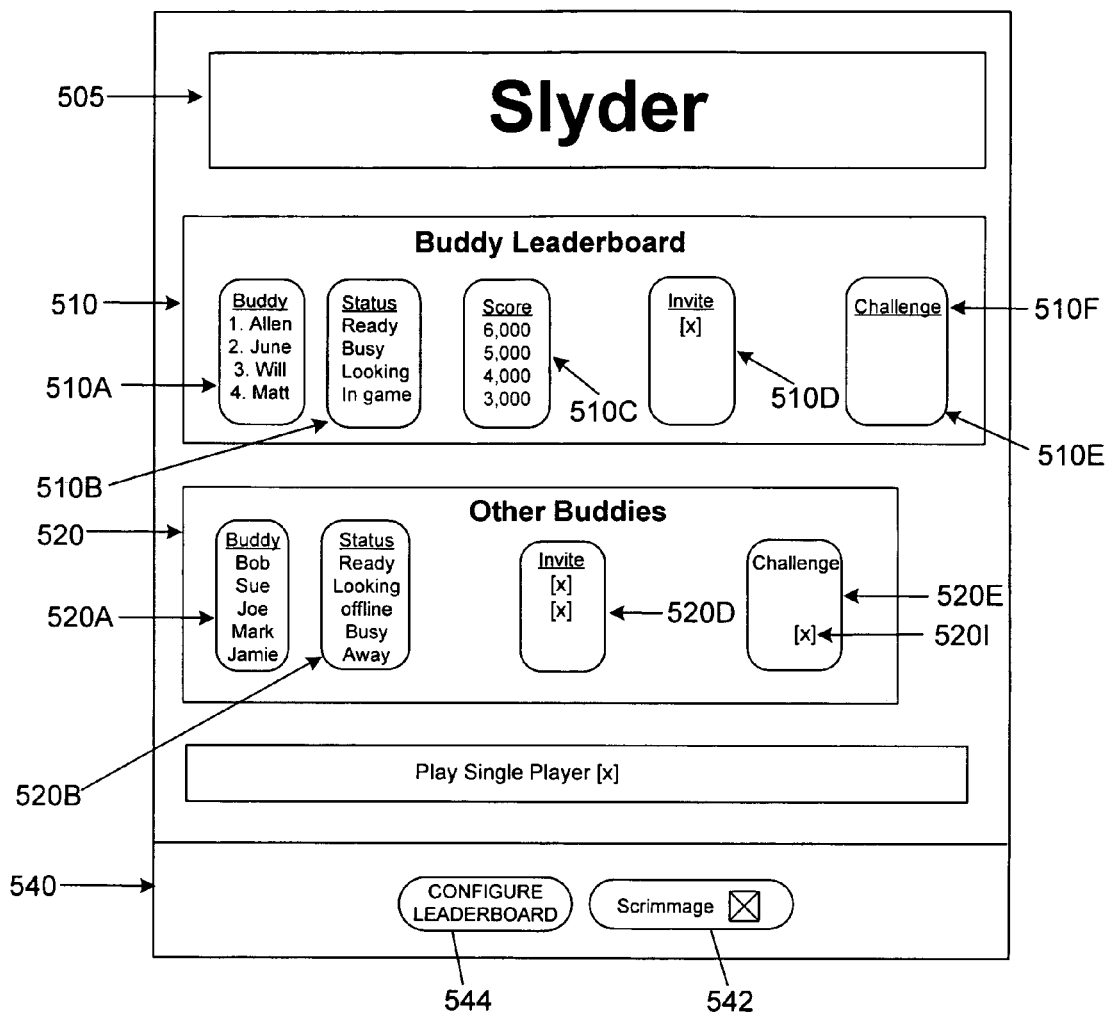

FIG. 5 shows a user interface 500 that illustrates yet another example user interface that represents an integrated buddy leaderboard and player selector for a particular game. The user interface 500 may be implemented as a user interface of an instant message service or as part of a game application.

The user interface 500 includes a game identifier 505, buddy leaderboard 510 that identifies the highest scoring buddies, and a game buddy list 520 that identifies buddies other than the buddies listed in the leaderboard 510. Both the leaderboard 510 and the game buddy list 520 are associated with a particular on-line game 505. The buddy leaderboard 510 and the game buddy list 520 may be useful to allow a user to identify and invite for a game both one or more of the high scoring players from the user's buddies and one or more other buddies who are not high scoring players and, as a result, don't appear on the buddy leaderboard 510.

The buddy leaderboard 510 includes, for each buddy, a screen name 510A, a status 510B related to whether the buddy is available to play a game, and a score 510C. The buddy status 510B indicates the readiness of the corresponding buddy to play the identified game 505. Examples of a status include that a buddy is ready to play a game (i.e., "Ready"), that the buddy is busy and is unable to play a game (i.e., "Busy"), and that the buddy is seeking to play a game (i.e., "Looking"). Other examples of a status may include that the buddy is in a game currently (i.e., "In game"), is not on-line (i.e., "Offline"), or is away from the computing device or communication device (i.e., "Away"). The buddies presented in buddy leaderboard 510 are presented in ranked order based on the score 510C corresponding to each buddy.

The buddy leaderboard 510 also includes controls for inviting a buddy to play the game identified in game identifier 505. In one mode (which may be referred to as an "invite" mode), an invitation is sent to a buddy whose on-line presence is recognized by the invitation service, (e.g., the instant message service or the game application). For example, if a buddy is signed-on to the instant message service, a user is able to send an on-line invitation to the buddy using an invite control 510D that corresponds to the screen name of the buddy to be invited. The invitation is sent to the buddy in order to ask the buddy to join a game at the time the invitation is sent or shortly thereafter (e.g., when the buddy responds to the invitation).

In another mode, a challenge is sent to a buddy when a control 510E that corresponds to the buddy is selected. The challenge control 510e enables a user to challenge a buddy to a game at a future time, even if the buddy is not presently signed-on to the invitation system. In some implementations, the challenge may be delivered when the buddy signs-on to the game application or the instant messaging system. In other implementations, the challenge may be delivered to the buddy through other mechanisms, such as an electronic mail system or a SMS ("short message service") text message. Additionally or alternatively, some implementations also may provide a capability for players to schedule a time to play the game in the future.

The game buddy list 520 lists other buddies of the buddy list owner that are associated with the game identified by the game identifier 505. The game buddy list 520 includes, for each buddy, a screen name 520A and a status 520B indicating the corresponding buddy's availability to play a game. In some implementations, the game buddy list 520 also may include a score for each buddy and/or may rank each buddy based on the buddy's relative score. The game buddy list 520 also includes an invite control 520D and a challenge control 520E to invite or challenge, respectively, a corresponding buddy in the game buddy list.

As illustrated in FIG. 5, a buddy 510F from the buddy leaderboard 510 and two buddies 520B and 520I1 from the game buddy list 520 are to be invited to the game, and an offline challenge is to be sent to the buddy 520I on the game buddy list 520.

The user interface 500 also includes controls 540. A control 542 enables a user to designate a game to which players from the buddy leaderboard 510 or the game buddy list 520 are being invited or challenged as a scrimmage—that is, the game will not count toward the players' accumulated score in the buddy leaderboard 510 (which, in turn, is reflected in the relative ranking or standing of the players in the buddy leaderboard 510). A player or group of players may enjoy the ability to designate a game as a scrimmage and play a game without concerns about affecting the player's ranking on the buddy leaderboard 510. In some implementations, only some users may be designated as having the ability to designate a game for a particular leaderboard as a scrimmage.

A control 544 enables a user to configure the buddy leaderboard 510. The configure leaderboard control 544 is operable to display a user interface, such as user interface 600 of FIG. 6, that allows a user to configure the buddy leaderboard 510.

Figure 6:
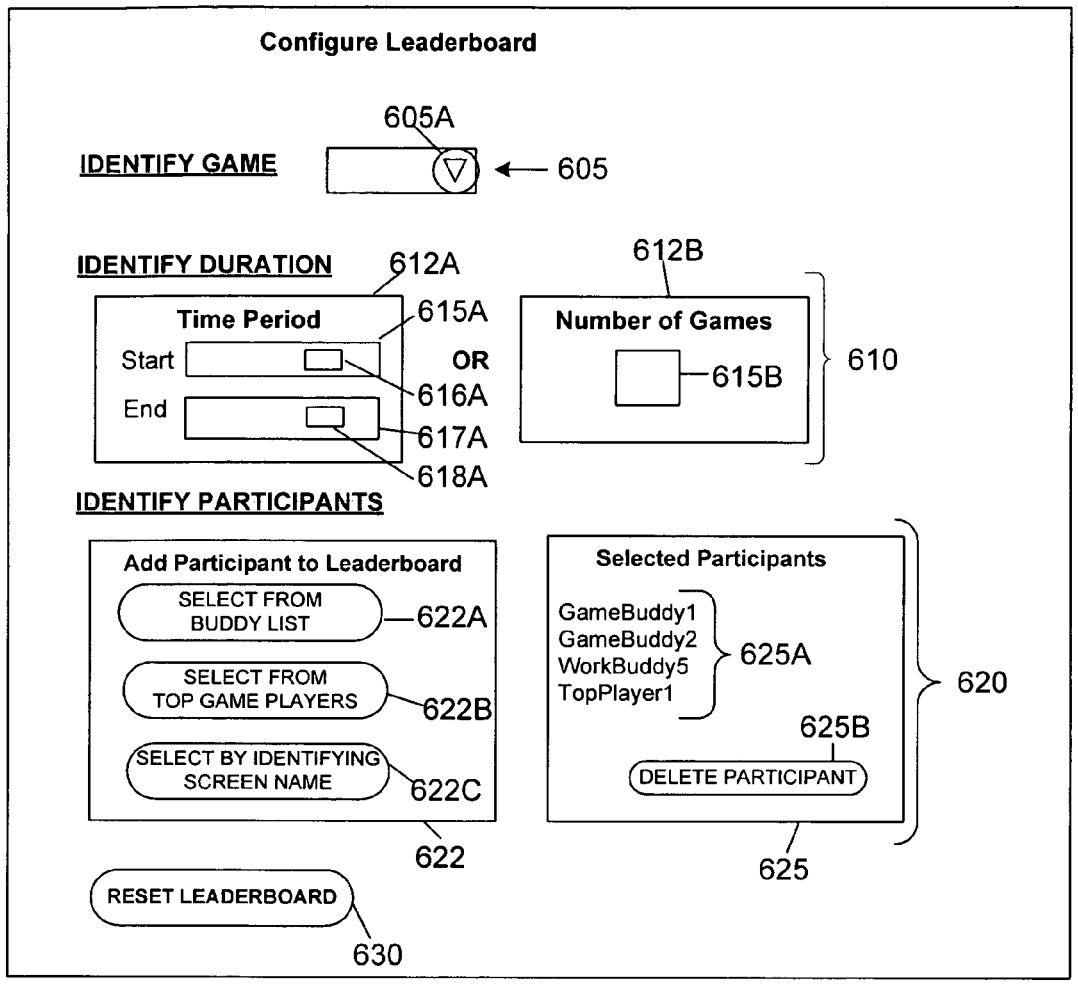
FIG. 6 is a diagram of an exemplary user interface for configuring a leaderboard from which potential participants may be invited.

FIG. 6 illustrates a user interface 600 that is operable to enable a user to create and/or configure a buddy leaderboard from which buddies may be invited to participant in a particular game. The leaderboard configuration window 600 includes a portion 605 to identify a particular game to which the leaderboard applies. A user may identify the game using a control 605a that lists all available games for which a leaderboard may be created and subsequently configured.

The leaderboard configuration window 600 also includes a portion 610 to identify a duration for the leaderboard. The duration portion 610 may be identified based on a time period 612A or based on a number of games 612B. The time period 612A enables a user to identify a start date 615A for the time period by optionally using a calendar control 616A to display a calendar by which the start date 615A may be identified. Similarly, a user may identify an end date 617A and, optionally, may use a calendar function 618A to identify the end date 617A. The time period identified by the start date 615A and the end date 617A defines the time period during which games that are played by buddies associated with the leaderboard count toward the ranking of the buddies on the leaderboard. Alternatively, a user may identify a number of games 615B to be used to define the duration of the leaderboard.

The leaderboard configuration window 600 also includes a portion 620 to identify participants (e.g., buddies) associated with the leaderboard. The participant identification portion 620 includes a window 622 to identify participants to add to the leaderboard 622. Multiple options 622A-622C are presented from which a user may select to add one or more participants to the leaderboard. More particularly, a control 622A is operable to enable the user to select one or more users from the user's buddy list. A control 622B enables a user to select from top players for the game identified in 605A regardless of whether those players are listed on a buddy list associated with the user. In addition, a user may select control 622C to add a participant to the leaderboard by identifying a particular screen name of the participant to be added. For example, a user may be presented with a pop-up field in which the user types a screen name. Regardless of the method used to identify buddies (e.g., whether one or more of the controls 622A, 622B or 622C are used), the screen names of identified participants are presented in selected participant window 625. In particular, the buddies are listed in a selected participant list 625A. The selected participant window 625 also includes a control 625B operable to delete one or more of the participants from the selected participant list 625A.

The leaderboard configuration window 600 also includes a control 630 to force the reset of the leaderboard to which the leaderboard configuration applies. This may be useful when the duration criteria has not been met and all, some or designated participants on the buddy leaderboard agree to reset the scores of the leaderboard and re-start the accumulation of scores on which the ranking of the buddy leaderboard is based. In general, however, the duration information 610 is used to identify when the leaderboard will start and end the accumulation of scores for the buddy associated with the leaderboard.

Before discussing additional detail regarding the method by which a buddy may be invited to play a game from a leaderboard for the game, an example data format that may be used in maintaining a buddy leaderboard is first described.

Figure 7:
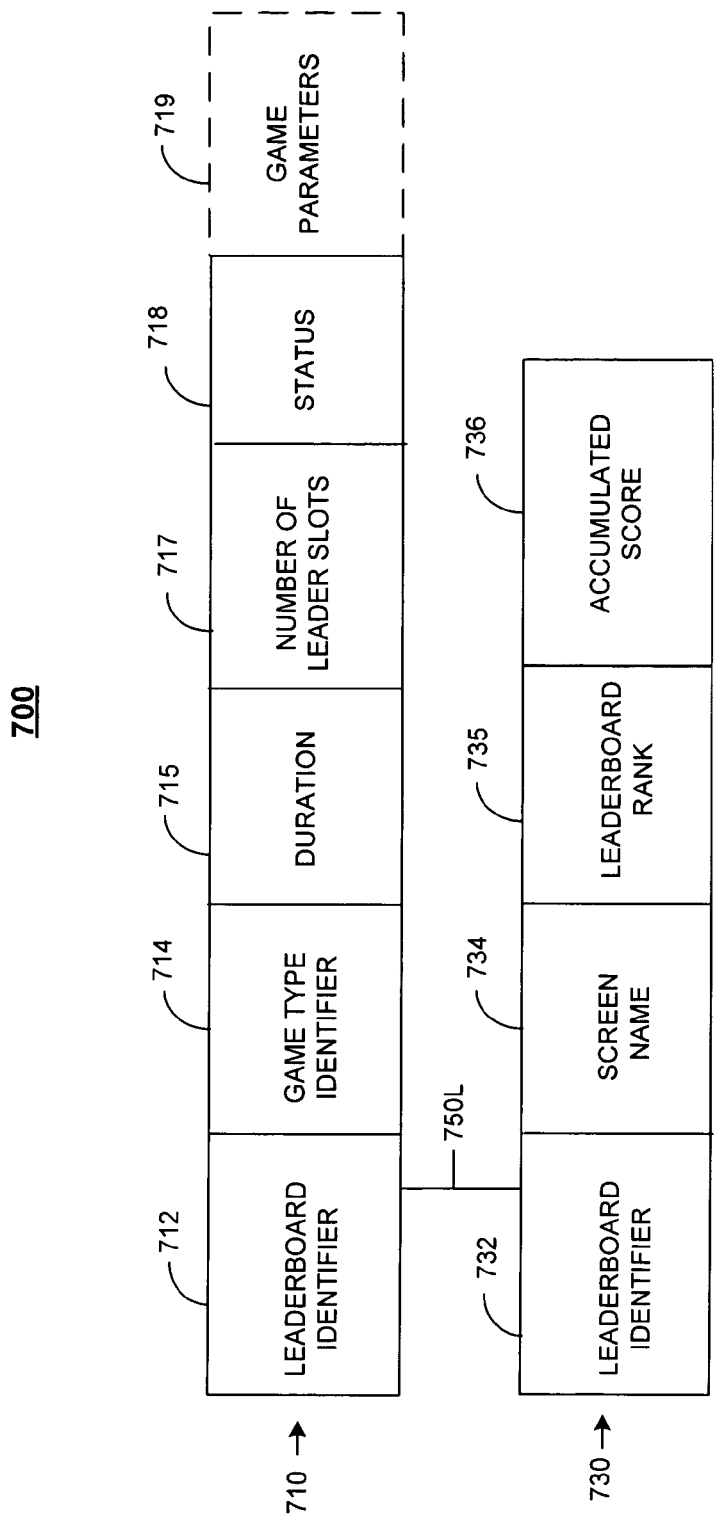
FIG. 7 is a block diagram illustrating a data structure for information related to a leaderboard from which potential participants may be invited.

FIG. 7 shows an example data structure 700 for a buddy leaderboard in simplified form. The data structure 710 includes leaderboard information having a leaderboard identifier 712 to uniquely identify a particularly leaderboard. The leaderboard information 710 also includes a game type identifier 714 that identifies a game to which the leaderboard applies. For example, the game type identifier 714 may identify a game name that was identified in identified game portion 605 of the leaderboard configuration window 600 of FIG. 6. The leaderboard information 710 also includes a duration 715 that identifies duration information that applies to the leaderboard identified by the leaderboard identifier 712. For example, the duration information 715 may identify start and end dates that define a particular period of time during which games that are played by participants associated with the leaderboard are to count toward the accumulated scores of each participant. The duration information 715 also may include a number of games (of the type identified in game type identifier 714) that are to be counted toward the leaderboard scores for the particular leaderboard.

The leaderboard information 710 also includes a number 717 of participant slots to be displayed for the leaderboard. For example, in some implementations, the user may be able to identify the number of leaders (e.g., the highest scoring three, five, or ten participants) that are displayed for the particular leaderboard.

The leaderboard information 710 also includes leaderboard status information 718. In one example, a status 718 may be that the leaderboard is open or active and games played by participants count toward leaderboard scores. Alternatively, a status 718 may indicate that a leaderboard is closed, that is, the duration 715 criteria have been met and scores for the game identified in game type identifier 714 no longer affect the leaderboard status of a user. The use of a status may enable the historical leaderboard information to be saved after the particular duration of a leaderboard has passed.

Optionally, the leaderboard information 710 also may include game parameters 719. In some implementations, a leaderboard may be created and managed for a game having particular game parameters (e.g., a particular type of poker). Thus, an entry of leaderboard information 710 may apply to a type of poker. For example, there may be multiple entries of leaderboard information 710 for poker where each poker entry of leaderboard information 710 applies to a type of poker.

The data structure 700 also includes participant information 730. The participant information 730 includes a leaderboard identifier 732 that uniquely identifies the leaderboard to which the participant is associated. The participant information 730 includes the screen name 734 of a participant associated with the leaderboard corresponding to the leaderboard identified by leaderboard identifier 732. The participant information 730 also includes a leaderboard rank 735 and an accumulated score 736 for the participant identified by the screen name 734.

The leaderboard information 710 and the participant information 730 are related through the use of leaderboard identifiers 712 and 732, respectively, as shown by link 750L. The relationship of leaderboard information 710 to participant information 730 using link 750L may be useful to allow multiple participants to be associated with each leaderboard.

Figure 8:
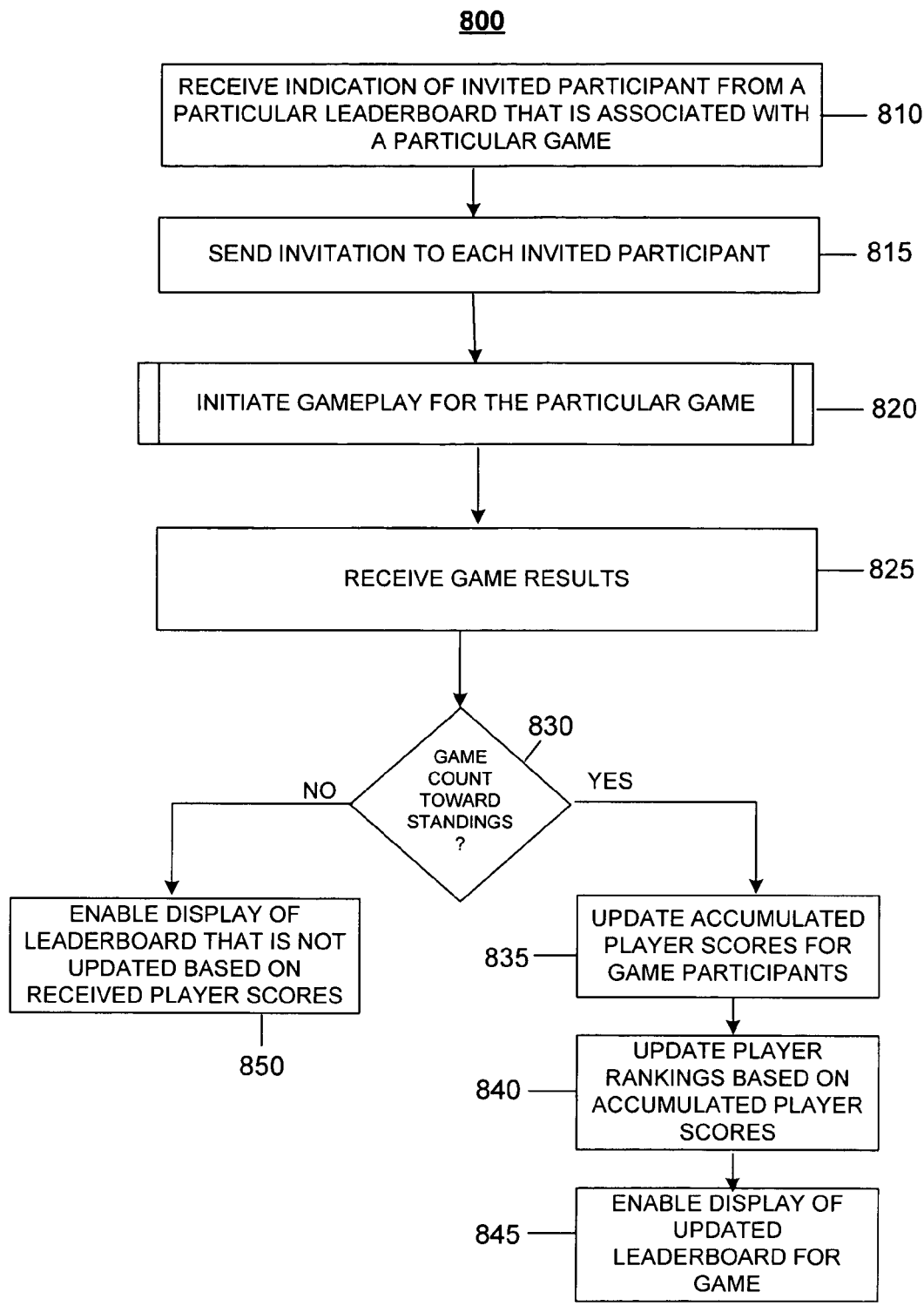
FIG. 8 is a flow chart of a process for inviting a potential player from a leaderboard and updating the leaderboard based on game results.

FIG. 8 depicts a process 800 for inviting a potential participant from a leaderboard and updating the leaderboard based on the results of the game play. The process 800 may be performed, for example, by a processor on an instant messaging provider system, a processor running an instant messaging application, or a processor executing a game application.

The process 800 begins when a user uses a leaderboard for an on-line game to invite potential participants to the on-line game. The processor receives an indication of an invited participant from a particular leaderboard that is associated with a particular game (step 810). This may be accomplished, for example, when the processor receives a screen name from a particular leaderboard and identifies the particular game based on the type of game to which the leaderboard applies.

An invitation is sent by the processor to each invited participant (step 815). When multiple buddies or other types of potential participants are to be invited to play a round of a particular on-line game, invitations to the multiple invited potential participants may be sent. In one example, an individual IM may be sent to each potential recipient, as shown in FIG. 3. In another example, an instant messaging service may be used to send an invitation to a chat session to each potential recipient. The IM chat session may be used to coordinate participation of invited potential participants, setting of game parameters, access to the on-line game, and, if appropriate, sending invitations to other potential participants. In yet another example, an instant messaging sender may use an instant messaging user interface having a command line interface to send invitations to multiple potential participants.

The processor launches the game application to initiate game playing for the particular game (step 820). Subsequently, the processor receives game results (step 825). For example, the processor may receive game results that include scores for each participant. The processor then determines whether the game is to count toward the leaderboard standings (step 830). This may be accomplished, for example, by determining whether the game was designated as a scrimmage in the invitation (e.g., whether a scrimmage indicator, such as the scrimmage indicator 544 of user interface 500, was activated).

When the processor determines the game is to count toward the leaderboard standings (step 830), the processor updates the accumulated score for each game participant (step 835). This may be accomplished, for example, by adding the score for a participant to the leaderboard accumulated score 744 associated with a particular screen name 734 associated with the leaderboard 732, as previously described with the respect to the participant information 730 of FIG. 7. The processor also updates player ranking based on accumulated player scores (step 840). For example, based on the updated accumulated score 736 for each participant associated with the leaderboard, the processor may sort the participant data and rank the participants from the one having the highest accumulated score to the one having the lowest accumulated score. In some implementations, the processor may store the leaderboard rank for each participant in leaderboard rank 735. The processor also enables the display of the updated leaderboard for the game (step 845). This may be accomplished, for example, by pushing to each client application of a buddy associated with the leaderboard, an updated version of the leaderboard information 710 and the participant information 730 for the leaderboard.

When the processor determines that the game is not to count towards the standings (step 830), the processor may enable the display of the leaderboard that is not updated based on received players scores (step 850). Thus, the process 800 enables the users to play games that do not count toward the standings for a particular leaderboard.

In general, only games played with buddies on the leaderboard count toward the accumulated score for a participant. In contrast, some implementations may count scores from a participant associated with the leaderboard toward the participant's leaderboard standings, even when the game is played with a participant that is not associated with the leaderboard.

Figure 9:
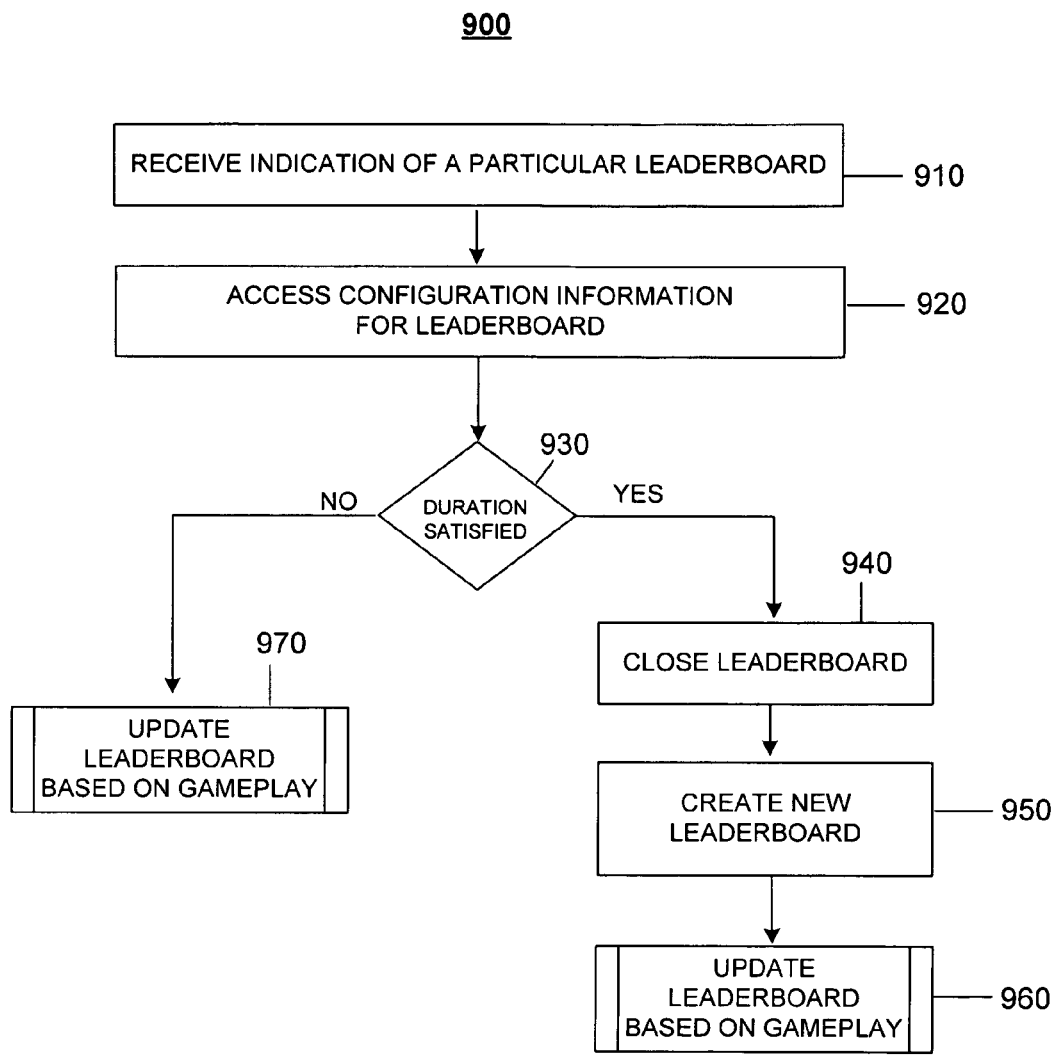
FIG. 9 is a flow chart of a process for determining when a leaderboard should be reset based on configuration parameters associated with the leaderboard.

FIG. 9 depicts a process 900 for determining when a leaderboard should be reset. The process 900 may be performed, for example, by a processor on an instant messaging provider system, a processor running an instant messaging application, or a processor executing a game application.

The process 900 begins when a leaderboard is to be updated based on configuration parameters of the leaderboard. The process 900 receives an indication of a particular leaderboard (step 910) and accesses configuration information for the particular leaderboard (step 920). In one example, the processor may access configuration information 700 that is substantially similar to leaderboard information 710 and participant information 730, as described previously with regard to FIG. 7.

The processor determines whether the duration criteria of the configuration information for the leaderboard has been satisfied (step 930). When the processor determine that the duration criteria is satisfied, the processor closes the existing leaderboard (step 940) and creates a new leaderboard (950). This may be accomplished, for example, by the processor changing the status setting 718 of the existing entry of leaderboard information 710 (corresponding to the leaderboard identified by the leaderboard identifier 712) to "closed." In any event, the processor "closes" the leaderboard information 710 such that the leaderboard information is no longer permitted to be updated based on further game play of the game identified by the game type identifier 714 by the participants identified in participants information 730 for the leaderboard. The processor may create a new leaderboard record (step 950) by creating records for leaderboard information 710 that are associated with the same leaderboard configuration information as the previous leaderboard that was closed in step 940, but that have a revised duration. Participant information 730 for the previous leaderboard also may be copied and created as new participant information entry 730. However, the leaderboard rank 735 and the accumulated score 736 for each participant is deleted or left blank.

The processor then updates the leaderboard based on the game play (step 960). The subprocess to update the leaderboard based on game play may be, for example, an implementation of steps 825 through 850 described previously with respect to FIG. 8. In this example process 900, a leaderboard always includes a leader. Other processes to update a leaderboard may reset the leaderboard (e.g., create a new leaderboard that does not have any rankings or that indicates all players are tied) after posting the game results in the previous version of the leaderboard.

When the processor determines duration criteria for the leaderboard are not satisfied (step 930), the processor updates the leaderboard based on game play (step 970) without creating a new leaderboard or changing the status of the current leaderboard.

Figure 10:
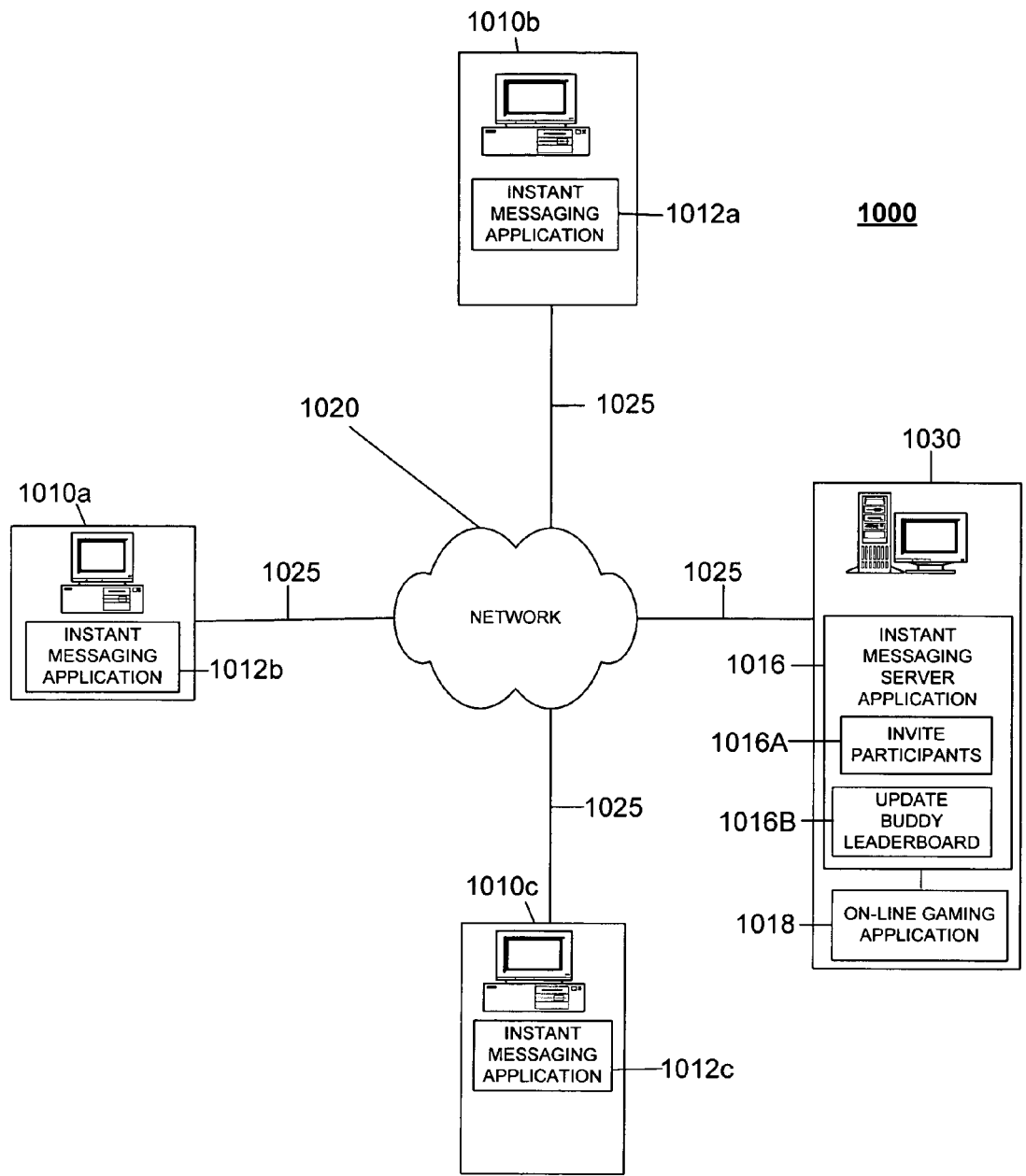
FIGS. 10 and 11 are block diagrams of a networked computing environment that supports instant messaging and on-line game playing, and which is capable of sending an invitation to a potential participant from a leaderboard.

Referring to FIG. 10, a networked computing environment 1000 supports communications between computer users. The networked computing environment 1000 may be used to send and receive instant messages. Users of the networked computing environment 1000 are distributed geographically and communicate using client systems 1010*a*-1010*c*. The client systems 1010*a*-1010*c* are shown as including, respectively, IM applications 1012*a*-1012*c*. A network 1020 interconnects the client systems 1010*a*-1010*c*. The client systems 1010*a*-1010*c* are connected to network 1020 through various communication paths 1025, such as a modem connected to a telephone line using, for example, serial line internet protocol (SLIP) or point-to-point protocol (PPP), or a direct network connection using, for example, transmission control protocol/internet protocol (TCP/IP). An instant messaging provider system 1030 also may be connected to the network 1020 and may be used to facilitate some direct or indirect communications between the client systems 1010*a*-1010*c*. The provider system 1030 includes an IM server application 1016 and an on-line game application 1018.

Each of the client systems 1010*a*-1010*c* and provider system 1030 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 1010*a*-1010*c* and the provider system 1030 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 1010*a*-1010*c* and the provider system 1030. For instance, such communications programs may include e-mail programs, IM programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 1010*a*-1010*c*.

Client systems 1010*a*-1010*c* and the provider system 1030 include a communications interface (not shown) used by the communications programs to send communications through network 1020. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer. The network 1020 typically includes a series of portals interconnected through a coherent system. Examples of the network 1020 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 1020 may include multiple networks or subnetworks, each of which may include, for example, a wired or wireless data pathway.

The IM applications 1012a-1012c include participant lists that include communications identities ("buddies") with which instant messages are exchanged using the respective client systems 1010a-1010c. More particularly, the IM applications 1012a-1012c include a buddy list for each user that uses the client systems 1010a-1010c to send and receive instant messages. The IM applications 1012a-1012c enable the users to send and receive instant messages with the client systems 1010a-1010c. Instant messages are sent between users of the client systems 1010a-1010c through the IM server application 1016 on the provider system 1030. The IM server application 1016 routes instant messages sent with the IM applications 1012a-1012c.

The provider system 1030 also includes an on-line game application 1018 that supports game sessions to which participants may be invited using a buddy list. The provider system 1030 includes code segments 1016A operable to permit a user to invite buddies listed on a buddy leaderboard to participant in an on-line game supported by the on-line gaming application 1018. The provider system 1030 also includes code segments 1016B operable to update a buddy leaderboard associated with particular buddies and a particular game.

As would be recognized by one of ordinary skill in the art, the networked computing environment 1000 may be structured and arranged differently. For example, the on-line game application 1018 may be operated on a server other than the server on which the instant messaging server application 1016 operates.

Figure 11:
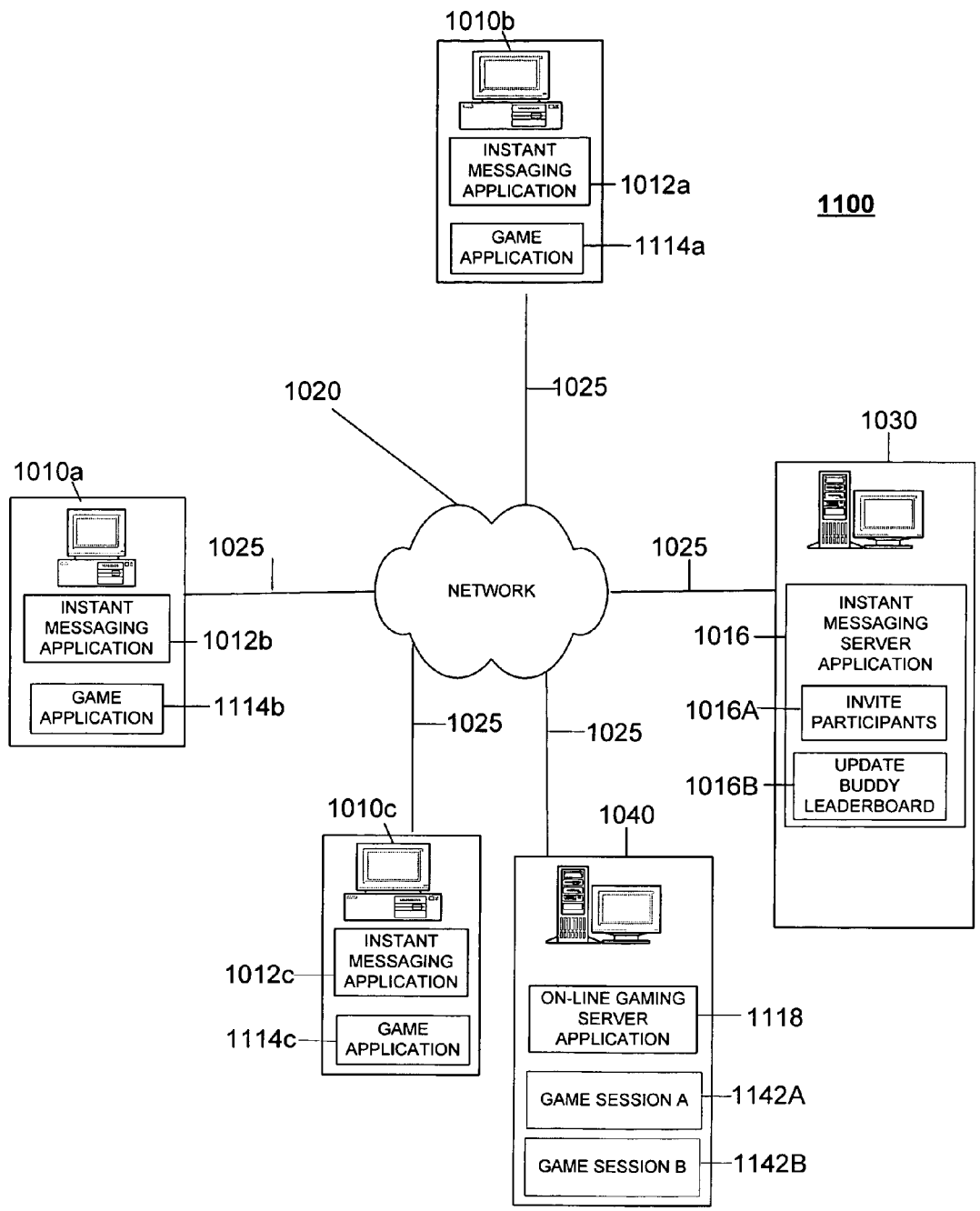

FIG. 11 illustrates a networked computing environment 1100 that supports communications between computer users. The networked computing environment 1100 may be used to invite multiple potential participants to play an on-line game. In contrast to the depiction of the networked computing environment 1000 in FIG. 10, the example of the instant messaging provider system 1030 in FIG. 11 provides instant messaging and invitation functionality for an on-line game application that is hosted on a game provider system 1140 that is separate from the instant messaging provider system 1030.

The game provider system 1140 is connected to the network 1020 over a connection 1025 and includes an on-line gaming application 1118 and two game sessions 1142A and 1142B. Each game session 1142A or 1142B represents a particular instance of a game operated using on-line gaming application 1118. For example, the game session 1142A may be a game session for an on-line checkers game between two users and the game session 1142B may be a game session for the on-line checkers game between two other users. The instant messaging provider system 1030 and the game provider system 1140 may be operated by the same business entity, though this need not necessarily be so. In some implementations, the instant messaging provider system 1030 and the game provider system 1140 may be connected by a network that itself connects to the network 1020.

In addition, each of the client systems 1010a-1010c includes a respective game application 1114a-1114c that is employed by the client system 1010a-1010c to access the game provider system 1140. In some implementations, a client game application may not be necessary. Thus, in this implementation, operating a game application requires a host gaming application 1118 on the on-line game provider system 1140 and a corresponding client game application 1114a-1114c on each client system 1010a-1010c. In many cases, a user of a client system 1010a-1010c must download the client-portion of the game application 1114a-1114c from the on-line game provider system 1140 to the respective client system 1010a-1010c before the user is able to play the on-line game application. Generally, once the game application is downloaded to the client system, the game application may be used for successive game sessions and often may only need to be transmitted to the client system the first time that a user plays a particular game.

In some implementations, the instant messaging provider system 1030 is operable to generate and transmit invitations to multiple potential participants for one of the game sessions 1142A or 1142B of the game provider system 1140. To do so, for example, a user of the instant messaging provider system 1030 may identify multiple potential game participants from the user's buddy list. The instant messaging provider system 1030 sends an invitation using the instant message application to each potential participant. The instant message invitation may include a hyperlink to the game session 1142A or 1142B to which the invitation applies. To accept the invitation to play the game session, the invitee clicks on the hyperlink, which is operable to cause the user interface to display the game session and to permit the invitee to begin playing the game.

Figure 12:
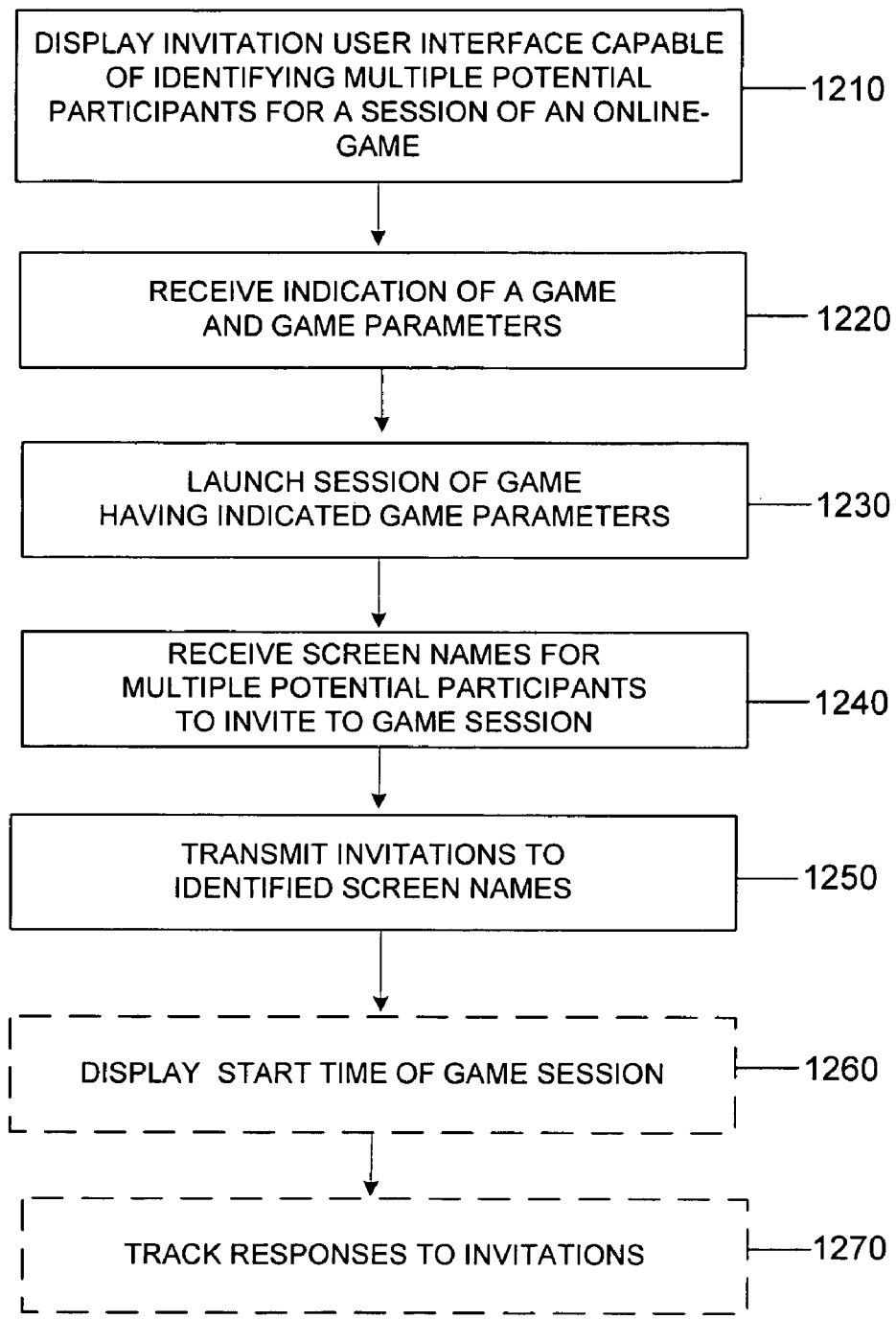
FIG. 12 is a flow chart of a process for inviting multiple potential participants to a session of an on-line game.

FIG. 12 depicts a process 1200 for inviting multiple potential participants to play an on-line game. The process 1200 may be performed, for example, by a processor on an instant messaging provider system, such as the instant messaging provider system 1030 of FIG. 10 or 11, or a processor running an instant messaging application, such as the instant messaging application 1012a, 1012b or 1013c of FIG. 10 or 11.

The process 1200 begins when a user indicates a desire to invite potential participants to an on-line game. To do so, for example, the user may activate an on-line games control of an instant messaging interface, such as control 148 of FIG. 1, which causes the processor to display an invitation interface operable to enable the user to invite potential participants (step 1210).

Figure 13:
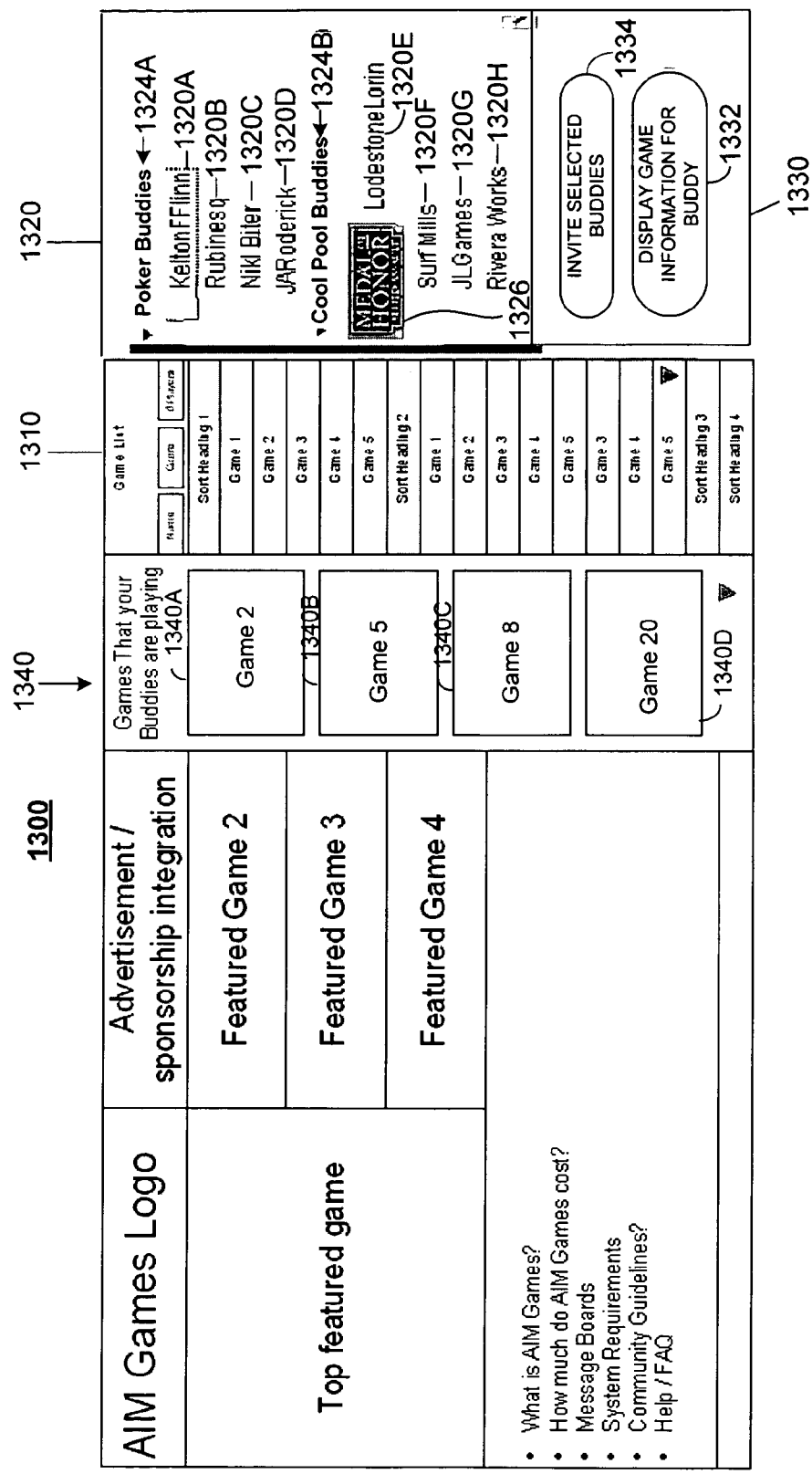
FIG. 13 is a diagram of an exemplary user interface for inviting multiple potential participants to a session of an on-line game.

Referring also to FIG. 13, an exemplary invitation interface 1300 includes a game list 1310 having multiple games sorted by category, a participant selection list 1320 and invitation controls 1330. The participant selection list 1320 is a buddy game list showing buddies 1320A-1320H, each of whom is associated with one of two buddy game groups 1324A or 1324B. In this implementation, the user may invite the buddies listed in the participant selection list 1320 regardless of the game with which the invited buddy is associated. For example, a buddy 1320A that is only associated with a "poker" game group 1324A may be invited to participant in any of the games in the game list 1310 (and is not restricted to be invited only to a poker game). Other implementations may restrict the games to which a particular buddy is permitted to be invited based on an association of the buddy with one or more particular game groups (e.g., a buddy in a poker buddy group may be able to be invited only to a poker game).

The invitation interface 1300 is operable to provide game information about game buddies. For example, an interface portion 1340 identifies games 1340A-1340D that buddies identified in the buddy list 1320 are playing. In one example, the games 1340A-1340D identified in the interface portion 1340 may identify the names of the most popular games that buddies identified on the buddy list 1320 are playing within a particular predetermined period of time. For example, the instant messaging system may keep track of the number of times each buddy plays a particular on-line game and report the games that are the most popular within a time period (e.g., a month, a quarter, or a year). In another example, the games 1340A-1340D may identify the games that at least one buddy of the buddy list 1320 is playing at the time the interface 1300 is displayed that is, the games identified in the interface portion 1310 may reflect the on-line presence of a buddy playing a particular game.

Additionally or alternatively, on-line game presence of a buddy may be reflected in a game icon 1326 displayed adjacent to a buddy in the buddy list 1320. As illustrated, the game icon 1326 may indicate the game that the buddy is playing, which, in this implementation, may be different from the game identified by the game group associated with the buddy. The ability to determine whether a buddy is playing a game or the particular game that a buddy is playing may be useful to the user when inviting potential participants to a game. For example, a user may prefer to invite only buddies who are not presently playing games so as to increase the likelihood that an invited buddy will accept the game invitation.

Control 1332 enables other types of game information to be displayed for a buddy.

Figure 14:
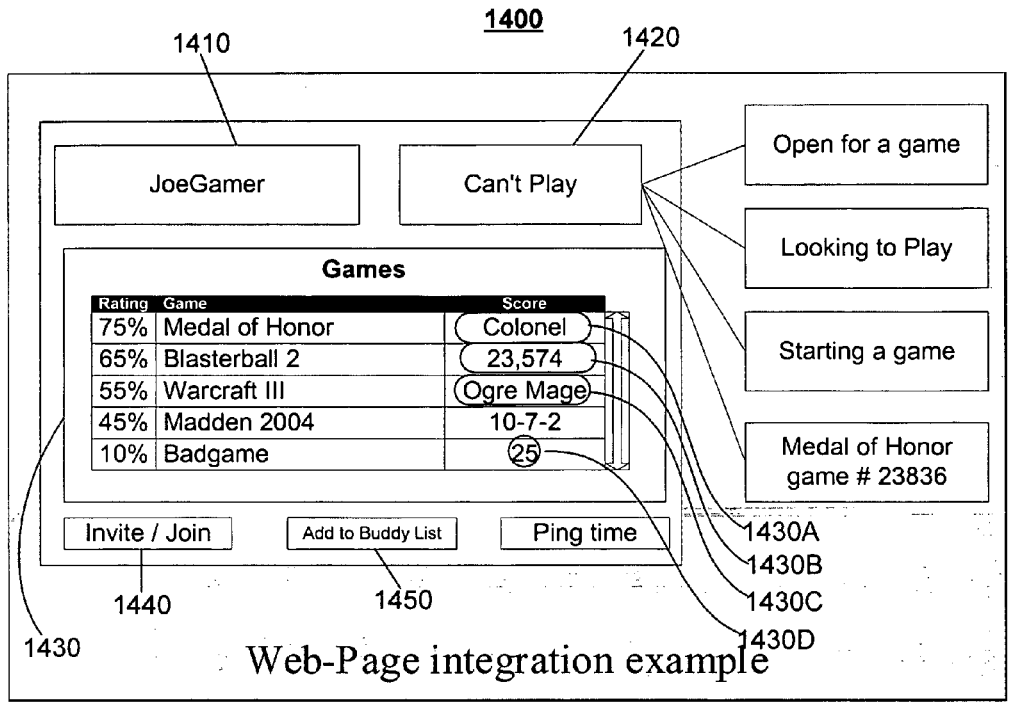
FIG. 14 is a diagram of an exemplary user interface for providing game information associated with a potential player.

Referring also to FIG. 14, a display 1400 presents game information related to a potential participant. The potential participant may be listed as a buddy of the user who is displaying the game information about the potential participant, though this need not necessarily be so. The game information display 1400 identifies the potential participant 1410 to whom the information applies and status information 1420 reflecting the player's readiness, ability or desire to play a game. The status information 1420, for example, may be an implementation status 510B or 520B of FIG. 5. The ability of a user organizing an on-line game to see status information about potential participants may help to expedite organizing the game (e.g., game start is not delayed by inviting participants who are unable or unwilling to play).

The display 1400 also may present information 1430 about particular games, such as the popularity of a particular game and a score 1430B or 1430D, or type of a character 1430A or 1430C that is associated with the potential participant and the particular game. The display 1400 also includes a control 1440 to invite the potential participant or join a game that the potential participant is presently playing or organizing.

The display also includes a control 1450 to add the potential participant to the buddy list of the user operating the computer on which the display 1400 is presented. This may be useful, for example, when game information is able to be displayed for game users other than buddies.

Other implementations may present the same or similar game information or a subset of the same or similar game information. For example, game information for a buddy may be presented in a pop-up window when a cursor controlled by a pointing device hovers over a screen name in the buddy list (which may be referred to as mousing-over the screen name), as described previously with respect to FIG. 2.

Referring again to FIG. 12, the processor receives, from user input responsive to the displayed invitation user interface, an indication of a game and, optionally, game parameters for the game (step 1220), launches a session of the game to which participants may be invited (step 1230), and receives, from user input responsive to the displayed invitation user interface, screen names for multiple potential participants to invite to the game session (step 1240). For example, the processor may receive an indication of one of the games in game list 1310 in FIG. 13, may launch the indicated game, and may receive multiple screen names from the buddy list 1320 in FIG. 13.

The processor then transmits invitations to the identified screen names (step 1250). In one example, an individual IM may be sent to each potential recipient, as shown in FIG. 3. In another example, an invitation to a chat session may be sent to each potential recipient using an instant messaging service. The IM chat session may be used to coordinate participation of invited potential participants, game parameters, access to the on-line game, and, if permitted, sending invitations to other potential participants. In yet another example, an instant messaging sender may use an instant messaging user interface having a command line interface to send invitations to multiple potential participants.

Figure 15:
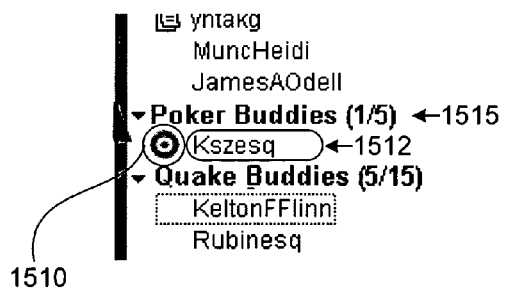
FIG. 15 is a diagram of an exemplary user interface of a participant list that provides an indication of an invitation to play a session of an on-line game.

Referring also to FIG. 15, in some implementations, notification of an invitation may be provided to a potential participant and the corresponding invitation may be displayed only in response to an indication by the potential participant to view the invitation. The invitation notification may be presented in a substantially unobtrusive manner. For example, as illustrated in FIG. 15, an invitation icon 1510 may be displayed on a buddy list 1500 of an invited potential participant to indicate a game invitation. Here, the invitation notification icon 1510 is adjacent to the buddy 1512 who is issuing the invitation (e.g., organizing the game). In some implementations, the invitation notification icon may be operable to display the invitation. For example, a user may click a button on a pointing device to activate the invitation icon and, as a result, the invitation corresponding to the invitation notification icon is displayed. Other notification methods where an invitee is made aware of a game invitation may be used. For example, a control to view an invitation may be displayed on a buddy list where the control is not associated with a particular buddy on the buddy list. The use of an invitation notification object (rather than direct display of the invitation itself) to notify an invitee about an invitation may reduce the likelihood of embarrassment or interruption of an invitee who receives a more obtrusive audible and visual notification of a game invitation. For example, an invitee who is on-line while at work may not wish to receive an invitation in the form of an instant message that pops-up on the invitee's display. Similarly, an invitee who is playing a game may not wish to receive an invitation that obscures the game display.

The invitation icon 1510 also may be used to represent a passive invitation that is provided to multiple potential participants without requiring a game organizer to identify particular potential participants. For example, when a game organizer starts a game, potential participants that include the screen name of the game organizer as a buddy on their respective buddy lists may be notified that a game is being organized or starting by the presence of the invitation icon 1510 adjacent to the game organizer's name. In this manner, for example, a game organizer may automatically notify potential participants of the opportunity to play a game without identifying and inviting particular potential participants.

For example, the owner of the buddy list 1500 may be notified that the buddy 1512 (i.e., "Kszesq") is organizing, has recently started, or is playing a game of poker (as indicated by the "Poker Buddies" category 1515) that the owner of the buddy list 1550 may be able to join. In some implementations, the potential participant (here, the owner of the buddy list 1500) may be able to join the game by activating the invitation icon 1510, which may, for example, display information to enable the potential participant to join the game, launch the game application associated with the identified game (here, poker), or otherwise enable the potential player to begin playing the game organized by the buddy 1512.

The use of a passive invitation that is broadcast or otherwise provided to multiple potential participants based on an affiliation (e.g., buddies) with the game organizer may help to reduce, or eliminate, the burden on the game organizer of inviting particular potential participants to play a game while permitting only buddies of the game organizer to participate in the game.

In some implementations, the presentation style or appearance of an icon used to represent a notification of an invitation may be different than the presentation style or appearance of an icon used to represent a broadcast, passive invitation to inform potential participants about an opportunity to join a game.

The invitation icon 1510 may be removed from the buddy list 1500 when a potential participant is no longer able to join a game. For example, the invitation corresponding to the invitation icon 1510 may have been actively withdrawn, such as when the game organizer cancels the invitation as described previously with respect to FIG. 4. Alternatively or additionally, the invitation icon 1510 may be removed automatically without requiring user manipulation when a condition has been met to trigger the removal of the invitation icon 1510. Examples of triggering conditions include that the game has a sufficient number of participants (e.g., a poker game has five participants) or that the game has reached a point where participants are no longer permitted to join (e.g., a game has started or a multiple-stage game has reached a particular stage where participants are no longer permitted to join).

Figure 16:
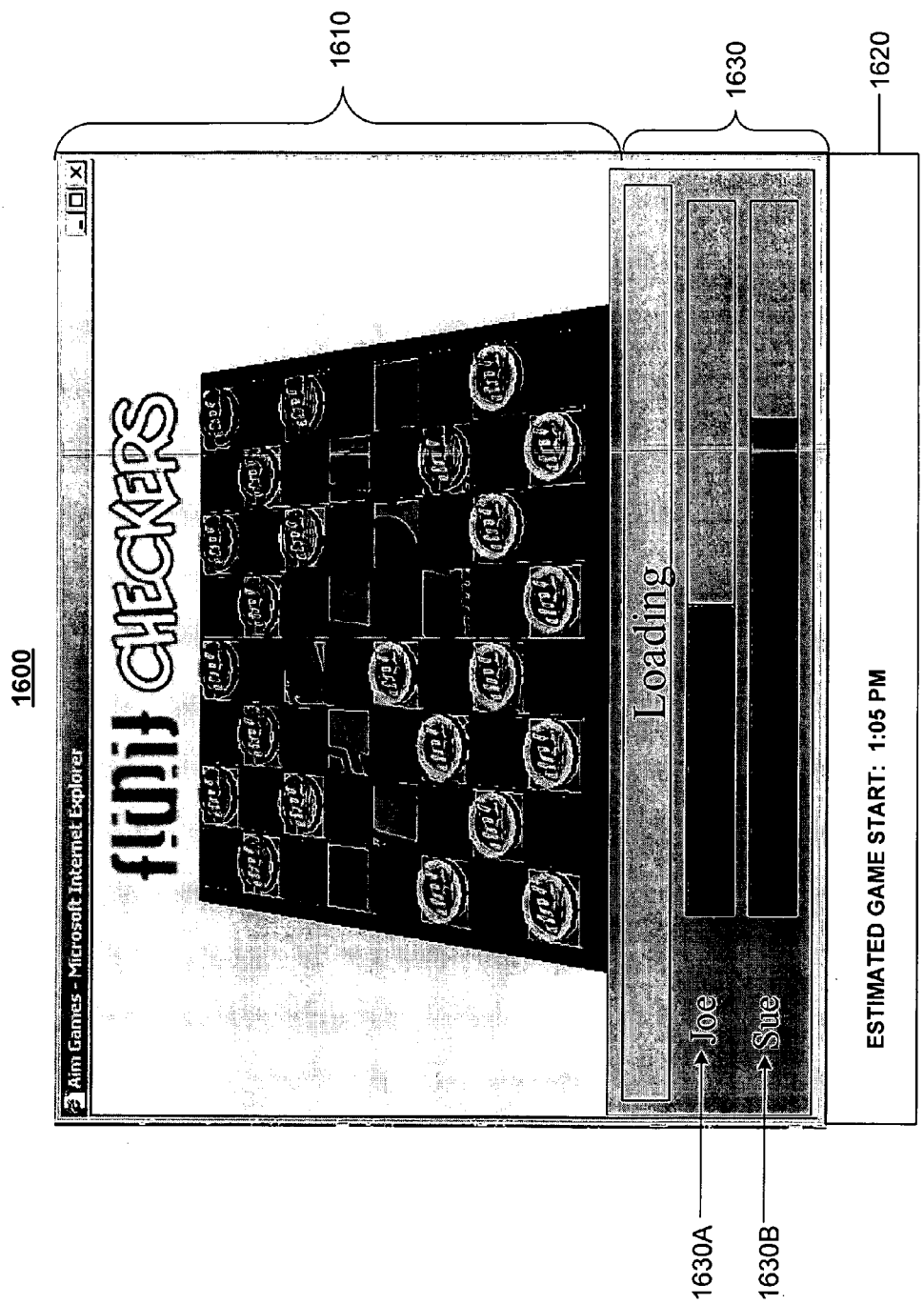
FIG. 16 is a diagram of an exemplary user interface that displays an estimated start time for a session of an on-line game.

Referring to FIGS. 12 and 16, the processor may display an estimated time at which the game session is expected to start (step 1260). To do so, the processor may display a user interface 1600 that identifies the game 1610 and an estimated game start time 1620. In some implementations, the time 1620 may be displayed as part of a game invitation interface, such as game invitation interface 1300 of FIG. 13, or as part of a game buddy list, such as buddy list 110 of FIG. 1. Additionally or alternatively, the processor may display an estimated time until the game session is to begin.

In some implementations, the processor may display a progress dialog 1630 that informs of the progress of transmission of the game application from the game application server to one or more client computers used by the game participants. In this example, the progress dialog 1630 shows the progress of transmission of the game application to a first client system 1630A for use by a first game participant (here, "Joe") as well as the progress of transmission of the game application to a second client system 1630B for use by a second game participant (here, "Sue"). This enables a third party who is not involved in the transmission or receipt of the game application being transmitted to be informed of the transmission progress of the game application from the game application server. For example, all of the participants for a game session may be informed as to the progression of transmission of the game application to each participant who needs to receive the game application before game play may begin. More particularly, Joe may be informed as to the transmission progress 1630B of the game application to Sue's computer, whereas Sue may be informed as to the transmission progress 1630A of the game application to Joe's computer. This may be particularly useful to help a game participant to be able to estimate when the game is to begin, particularly when transmission time for the game application is substantial and may result in a noticeable, or, perhaps, irritating, delay in starting a game session.

The processor also may track responses to invitations by invitees (step 1270). For example, the processor may track which invited potential participants have accepted the invitation, which invited potential participants have declined the invitation, and which invited potential participants have not responded to the invitation. The results of tracking responses may be displayed, for example, in a user interface, such as user interface 400 in FIG. 4.

Figure 17A:
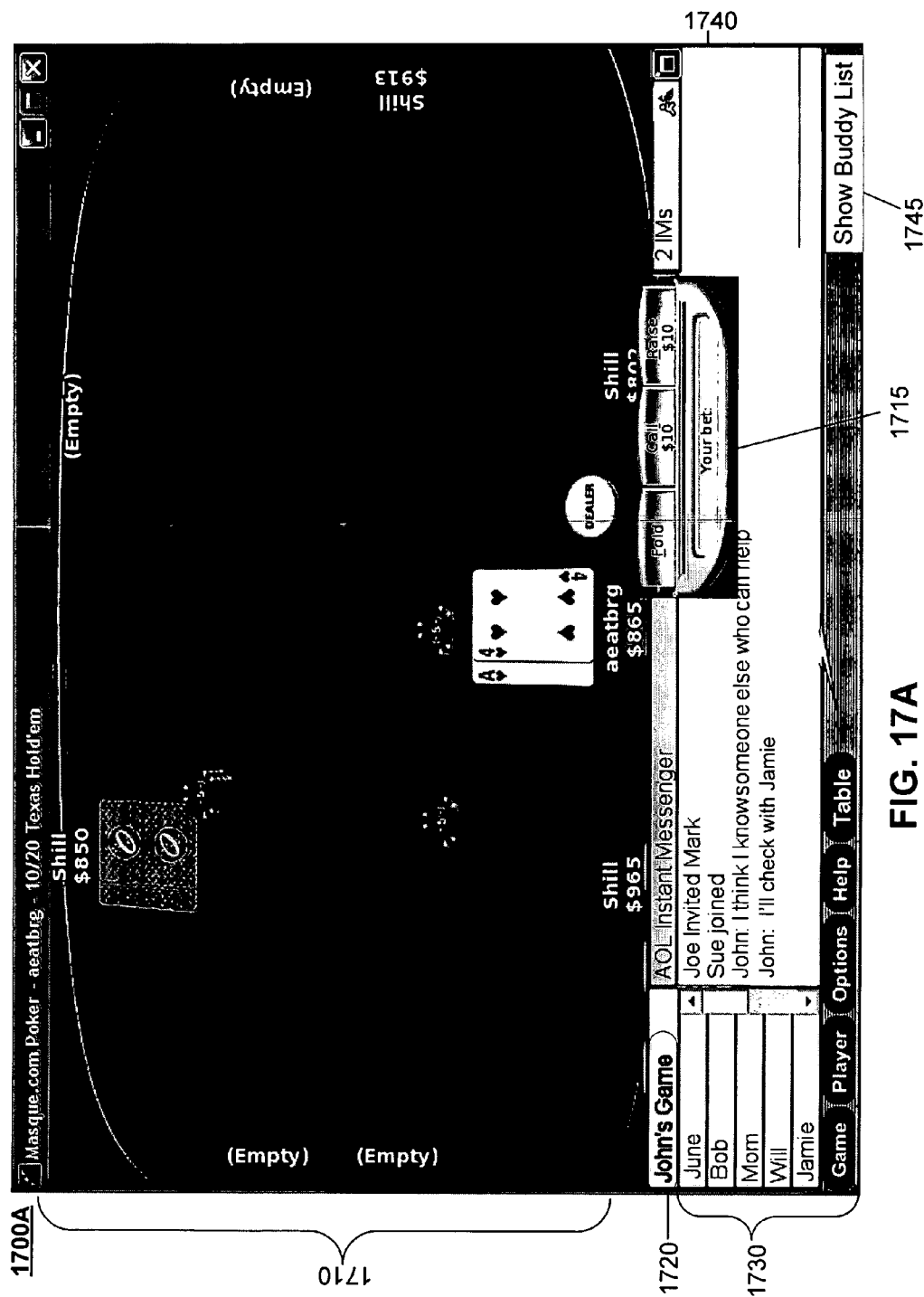
FIGS. 17A and 17B are exemplary game interfaces that are operable to invite a potential participant to participate in an ongoing session of an on-line game.
Figure 17B:
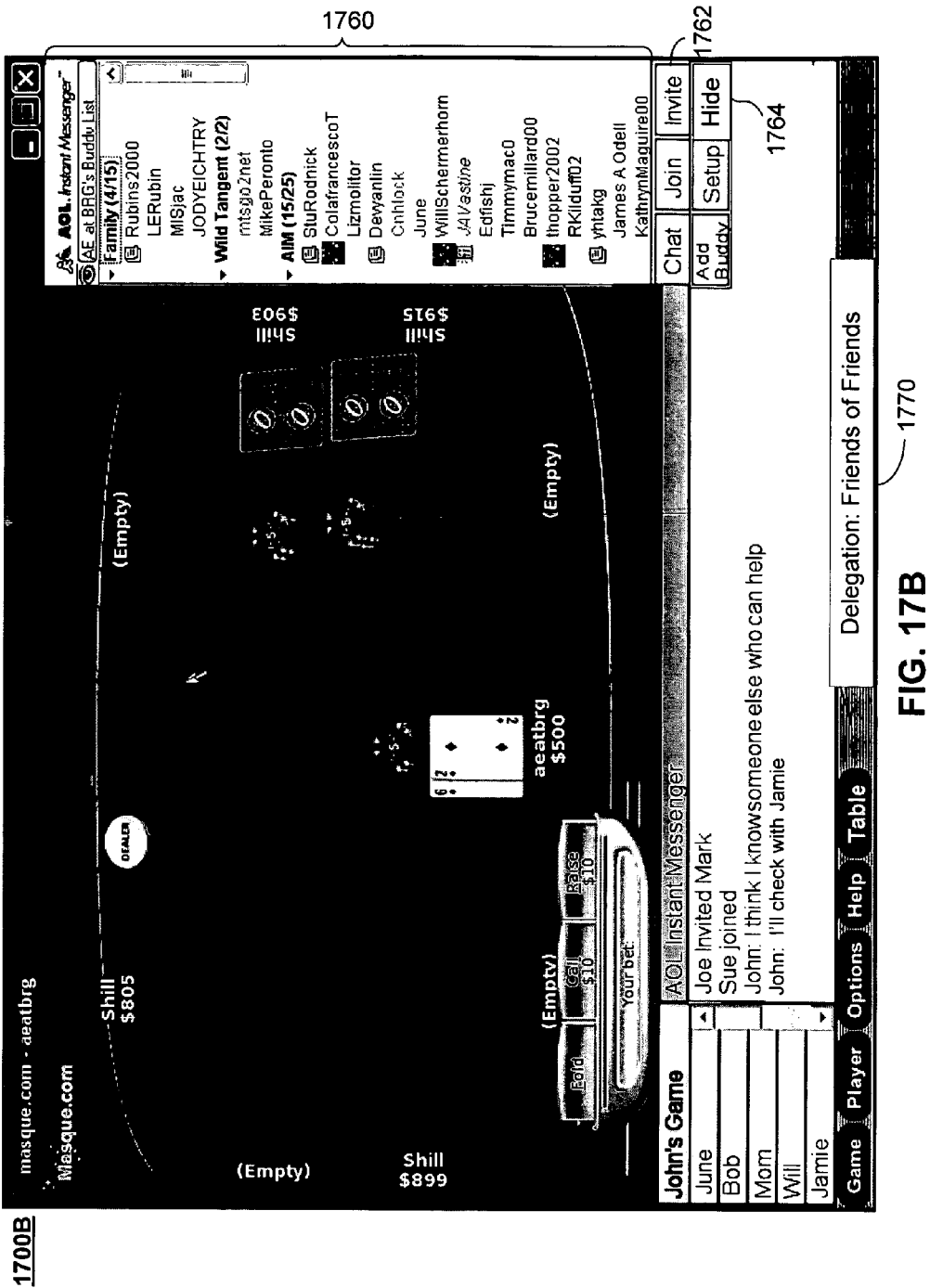

Referring to FIGS. 17A and 17B, the game interface 1700 may include a game play portion 1710 that displays the game status or action related to game play. As illustrated, game play portion 1710 shows an on-line poker game, and, more particularly, a representation of a poker table with a game in progress. The game interface 1700 also includes game controls 1715 that are operable to allow a user to play the game (e.g., make a move in the game) and identifies the game owner 1720 (e.g., a game organizer who invited the others to participate and/or initiated the game session). The game interface 1700A also includes a game participant list 1730 that identifies the screen names of the game participants ("players") who are playing the game. The game interface 1700A also includes an instant messaging portion 1740 that enables and displays message exchanges between the players. As illustrated, the instant messaging portion 1740 does not obscure the game play interface 1710. Thus, instant messages may be exchanged during game play without obscuring the game play interface 1710, which may minimize interference of game play.

The game interface 1700 includes a hidden buddy list (not shown) associated with the user who is playing the game. The game interface 1700 includes a show control 1745 that is operable to expose or display the hidden buddy list.

Referring now to FIG. 17B, the buddy list 1760 is exposed (e.g., visible in the game interface 1700) through the operation of the control 1745. The buddy list 1760 includes a control 1762 to invite a buddy to the game. Thus, a potential participant may be invited to participate in the game from within the game interface 1700.

As illustrated, when displayed, the buddy list 1760 does not obscure the game play interface 1710. This may be useful during the playing of a game so that the buddy list may be used to send instant messages or invite potential participants without obscuring the game play interface 1710 and, thus, potentially interfering with game play. The buddy list 1760 also includes a hide control 1764 that is operable to hide the buddy list 1760.

The game interface 1700B also includes delegation information 1770 that indicates information as to whether game participants other than the game owner are permitted to invite a potential participant.

In some games, particularly where there are a number of seats to fill for optimum game experience (e.g., as in a poker game), it may be desirable to permit an invitee or a game participant to invite another potential participant. For example, a user may wish to have a private game (e.g., not open to any other player) and may start organizing a game for seven participants from the user's buddy list. The game organizer may find that only four buddies are able to play. In such a case, the game organizer may allow some or all of the four buddies, in turn, to invite one or more potential participants to play in the game.

As shown, the delegation information 1770 indicates that game participants are permitted to invite another potential participant. In some implementations, other types of delegation authority may be provided. In one example, a user may permit participants to invite others to a game session of a particular type of game and not allow participants to invite others to a game session of a different type of game. In other examples, a user may permit only participants who are members of the user's buddy list to invite others or may permit only particular users to do so (regardless of whether the particular users are members of the user's buddy list). In yet another example, a user may permit only participants who are members of a particular game group on the user's buddy list to invite others. In some implementations, a participant may invite another participant only when the other participant has been directly invited by the game owner. For example, a game owner may invite a first participant who is permitted to invite a second participant, but may not permit the second participant who is invited by the first participant (rather than the game owner) to invite another participant. In some implementations, default delegation authority may be associated with a user for use in creating game sessions or particular types of game session. This may be particularly useful when multiple types of delegation authorities, some of which may be complex, are enabled by the instant messaging game application.

Some game participants may enjoy an on-line game that has a capability for a game participant to chose among several categories of players to invite to play a session of the on-line game. For example, a player of a game may chose to invite another natural person to play or may chose to invite a machine-based player (or otherwise chose to play against the game itself or run a game simulation). A player may prefer to invite, or play against, a machine-based player for the purpose of, for example, experience a game for the first time, to learn the rules of the game, to gain practice and skill, when another player is not available to play, or when another player of a particular and desired skill level is not available.

A multi-player on-line game that includes a capability to invite natural-person players and machine-based players also may be useful. A machine-based player may be an automated or simulated player that participates in an on-line game without requiring input or manipulation by a natural person. A machine-based player may be implemented, for example, by using code segments configured to simulate strategies, moves and other types of game participation of a natural person playing the on-line game.

For example, a poker game may include a game organizer, several of the game organizer's friends, and a machine-based player of a particular skill (e.g., a simulation of a world-class poker player). In some implementations, the machine-based player may be a representation of a natural person of a particular skill-level. For example, a machine-based player may represent a branded-image of a world poker champion and incorporate the strategies of the world poker champion. A game organizer may be given the opportunity to invite the machine-based player representing the branded-image of the world poker champion to play poker with the game organizer and the game organizer's friends. In this manner, and by charging for participation of machine-based players and, perhaps, stratifying fees based on emulated personas, the on-line game may be further monetized.

The ability for a player (who may be the game organizer or sponsor, though need not necessarily be so) to control categories of players who may play a session of the game may be useful. For example, a player may wish to control whether only friends may be invited, friends or friends of friends may be invited, or anybody waiting to play the game may be invited. In addition, a player may wish to control the combination of friends, friends of friends, and anonymous players (who may be, for example, waiting in a game lobby) may be invited to play a session of the game. For example, a player may indicate that, for a session of an on-line game, four players must be friends, up to two more players can be friends of friends, and one player can be either an anonymous natural person or a machine-based player.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America On-line Instant Messenger), AOL (America On-line) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and on-line applications. For example, the techniques and concepts may be applied to an animated avatar that acts as an information assistant to convey news, weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

In addition, although the examples above are given in an instant message context, other communications systems with similar attributes may be used. For example, a participant list may be used in a chat room, in electronic mail (e-mail) communications, and text messaging between voice-enabled devices, such as enabled through Short Message Service (SMS) text messaging. Also, the user interface may be a viewable interface, an audible interface, a tactile interface, or a combination of these.

The techniques and concepts related to a buddy leaderboard have been described in relation to an on-line gaming application. However, the techniques and concepts also may be applicable to an off-line game. For example, a leaderboard for buddies may be created and maintained by entering results from an off-line game (e.g., a poker game that is a traditional card game played with participants in the physical presence of one another and is not an on-line game).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method for inviting a participant to play a session of an on-line game, the method comprising:
   receiving, from a user designated as a game organizer, an indication of a potential participant of an on-line game accessible over a network of computers;
   enabling transmission of an invitation to the potential participant to play the session of the on-line game, wherein:
      the invitation includes a game parameter to be applied to the session of the on-line game and a revise control operable to enable the potential participant to indicate a different game parameter for the on-line game, and
      the game parameter represents a configuration parameter indicating how the online game is to be played;
   receiving an indication of a different game parameter from the potential participant, the different game parameter representing a configuration parameter of the game indicating how the on-line game is to be played and a condition under which the potential participant is willing to play the on-line game; and
   communicating the different game parameter to the user designated as the game organizer.

2. The method of claim 1 wherein the user designated as the game organizer is a user designated as an organizer of the session of the on-line game, and the method further comprising applying the different game parameter to the session of the on-line game without affecting the designation of the game organizer of the session of the on-line game.

3. The method of claim 1 further comprising:
   applying the different game parameter to the session of the on-line game; and
   designating the potential participant as a game organizer of the session of the on-line game.

4. The method of claim 1 further comprising:
   applying the different game parameter to the session of the on-line game; and
   designating the potential participant as a game organizer of the session of the on-line game to replace the user designated as the game organizer.

5. The method of claim 1 wherein communicating the different game parameter to the user designated as the game organizer comprises:
   communicating a decline indicator for the on-line game session to the user designated as the game organizer; and
   sending a new invitation to the user designated as the game organizer for a new session of the on-line game, wherein the new invitation includes a new game parameter to be applied to the new session of the on-line game.

6. The method of claim 1 wherein the invitation includes a control to conditionally accept the invitation to indicate that the invited participant is only willing to play if a revised game parameter is applied to the session of the on-line game.

7. The method of claim 1 wherein the revise control is operable to initiate an instant messaging session between a user who received the invitation and a user who sent the invitation.

8. The method of claim 1 wherein the revise control is operable to initiate a chat session between a user who received the invitation and a user who sent the invitation.

9. A computer-implemented method for initiating an on-line game, the method comprising:
   receiving, from a first user, an indication of a second user of an on-line game accessible over a network of computers and an indication of at least one selection of a game condition to be applied to the session of the on-line game;
   enabling transmission of an invitation to the second user to play the session of the on-line game, wherein the invitation includes the indication of the at least one selection of a game condition to be applied to the session of the on-line game;
   enabling transmission of a reply invitation to the first user that invited to play the session of the online game, wherein the reply invitation includes an indication of at least one different selection of a game condition to be applied to the session of the on-line game;
   receiving an indication of acceptance of the at least one different selection of a game condition to be applied to the session of the on-line game; and
   initiating the session of the on-line game, wherein at least one different selected game condition is applied to the session of the on-line game.

10. The method of claim 9 wherein the first user is a user designated as an organizer of the session of the on-line game, and the method further comprising applying the different selected game condition to the session of the on-line game without affecting the designation of the organizer of the session of the on-line game.

11. The method of claim 9 further comprising:
   applying the different selected game condition to the session of the on-line game; and designating the second user as a game organizer of the session of the on-line game.

12. The method of claim 9 further comprising:
   applying the different selected game condition to the session of the on-line game; and designating the second user as a game organizer of the session of the on-line game to replace the first user designated as a game organizer.

13. The method of claim 9 wherein enabling transmission of a reply invitation to the first user comprises:
   communicating a decline indicator for the on-line game session to the first user; and sending a new invitation to the first user for a new session of the on-line game, wherein the new invitation includes a new game parameter to be applied to the new session of the on-line game.

14. The method of claim 9 wherein the invitation includes a control to conditionally accept the invitation to indicate that the second user is only willing to play if a revised game parameter is applied to the session of the on-line game.

15. The method of claim 9 wherein the revise control is operable to initiate an instant messaging session between the first and second users.

16. The method of claim 9 wherein the revise control is operable to initiate a chat session between the first and second users.

* * * * *